(12) United States Patent
Monsen

(10) Patent No.: US 7,463,672 B2
(45) Date of Patent: Dec. 9, 2008

(54) TECHNIQUE FOR ADAPTIVE MULTIUSER EQUALIZATION IN CODE DIVISION MULTIPLE ACCESS SYSTEMS

(76) Inventor: Peter Monsen, 370 Hollow View Rd., Stowe, VT (US) 05672

( * ) Notice: Subject to any disclaimer, the term of this patent is extended or adjusted under 35 U.S.C. 154(b) by 665 days.

(21) Appl. No.: 11/082,621

(22) Filed: Mar. 16, 2005

(65) Prior Publication Data
US 2005/0207477 A1  Sep. 22, 2005

Related U.S. Application Data

(60) Provisional application No. 60/553,779, filed on Mar. 16, 2004.

(51) Int. Cl.
  *H04B 1/00* (2006.01)
(52) U.S. Cl. .............. 375/147; 370/319; 370/320; 370/321; 370/330; 370/335; 333/150; 333/155; 333/152; 333/193; 333/196
(58) Field of Classification Search ............ 375/233, 375/316, 130
  See application file for complete search history.

(56) References Cited

U.S. PATENT DOCUMENTS

| | | |
|---|---|---|
| 4,112,370 A | 9/1978 | Monsen |
| 4,328,585 A | 5/1982 | Monsen |
| 4,365,338 A | 12/1982 | McRae et al. |
| 4,644,562 A | 2/1987 | Kavehrad et al. |
| 5,220,320 A | 6/1993 | Assal et al. |
| 5,513,215 A | 4/1996 | Marchetto |
| 5,563,610 A | 10/1996 | Reudink |

(Continued)

FOREIGN PATENT DOCUMENTS

EP  0 650 271 A2  4/1995

OTHER PUBLICATIONS

"Square Root Kalman Filtering For High-Speed Data Received Over Fading Dispersive HF Channels," F. Hsu, IEEE Transactions on Information Theory, vol. IT-28, No. 5, pp. 753-763, Sep. 1982.

(Continued)

*Primary Examiner*—Shuwang Liu
*Assistant Examiner*—Lihong Yu
(74) *Attorney, Agent, or Firm*—Edwards Angell Palmer & Dodge LLP; Peter J. Manus

(57) ABSTRACT

A radio communication method and system for transmitting multiple-user digital data information in a Code Division Multiple Access (CDMA) format over multipath and mutual-interfering channels to a receiving terminal with diversity antennas and equalization signal processing. At the receiving terminal, diversity antenna signals are grouped into time blocks and replicas are generated of the user-unique CDMA sequence signals for a set of K mutually interfering users. Within each time block the multiuser channel is estimated, equalization parameters are calculated, and decision-feedback equalization is used to produce multiuser estimates associated with a subset $\lambda$ of the K users. These estimates are deinterleaved and error-correction decoded to recover transmitted digital data information for the subset of $\lambda$ users. The invention includes embodiments for a CDMA sequence period that is equal to or longer than the transmitted data symbol interval with applications to current CDMA reverse link and forward link standards. Also embodiments for both decision-directed and reference-directed channel estimation are given.

30 Claims, 11 Drawing Sheets

U.S. PATENT DOCUMENTS

| | | | |
|---|---|---|---|
| 5,590,399 | A | 12/1996 | Matsumoto et al. |
| 5,596,333 | A | 1/1997 | Bruckert |
| 5,619,503 | A | 4/1997 | Dent |
| 5,680,419 | A | 10/1997 | Bottomley |
| 5,719,899 | A * | 2/1998 | Thielecke et al. ........... 375/144 |
| 5,736,959 | A | 4/1998 | Patterson et al. |
| 5,838,742 | A | 11/1998 | Abu-Dayya |
| 5,987,037 | A | 11/1999 | Gans |
| 6,157,811 | A | 12/2000 | Dent |
| 6,460,156 | B1 * | 10/2002 | Laukkanen et al. ......... 714/755 |
| 6,647,071 | B2 * | 11/2003 | Sommer et al. ............. 375/285 |
| 6,650,716 | B1 * | 11/2003 | Ratnarajah .................. 375/347 |

OTHER PUBLICATIONS

"An Adaptive Receiver for Digital Signalling Through Channels With Intersymbol Interference", J.G. Proaxis and J.H. Miller, IEEE Transactions on Information Theory, vol. IT-15, No. 4, Jul. 1969, pp. 484-497.

"MMSE Equalization of Interference on Fading Diversity Channels", P. Monsen, IEEE Conference on Communications, Conference Record, vol. 1, Denver, CO, Jun. 1981, pp. 12.2.1-12.2.5.

"Adaptive Equalization and Interference Cancellation for Wireless Communication Systems", B.C.W. Lo and K.B. Letaief, IEEE Transactions on Communications, vol. 47, No. 4, Apr. 1999, pp. 538-545.

"Dynamic Channel Assignment in High-Capacity Mobile Communications Systems", D.C. Cox and D.O. Reudink, The Bell System Technical Journal, vol. 50, No. 6, Jul.-Aug. 1971, pp. 1833-1857.

"MMSE Equalization of Interference on Fading Diversity Channels", P. Monsen, IEEE Transactions on Communications, vol. COM-32, No. 1, Jan. 1984, pp. 5-12.

"Linear Multiuser Detectors for Synchronous Code-Division Multiple-Access Channels", R. Lupas and S. Verdu, IEEE Transactions on Information Theory, vol. 35, No. 1, Jan. 1989, pp. 123-136.

"Decorrelatng Decision-Feedback Multiuser Detector for Synchronous Code-Division Multiple-Access Channel", A. Duel-Hallen, IEEE Transactions on Communications, vol. 41, No. 2, Feb. 1993, pp. 285-290.

"A Family of Multiuser Decision-Feedback Detectors for Asynchronous Code-Division Multiple-Access Channels", A. Duel-Hallen, IEEE Transactions on Communications, vol. 43, No. 2/3/4, Feb./Mar./Apr. 1995, pp. 421-434.

"Information-Theoretic Considerations for Symmetric, Celllular, Multiple-Access Fading Channels—Part I", S. Shamai and A.D. Wyner, IEEE Transactions on Information Theory, vol. 43, No. 6, Nov. 1997, pp. 1877-1894.

Mobile Station-Base Station Compatibility Standard for Dual-Mode Wideband Spread Spectrum Cellular System, TIA/EIA/IS-95-A, 1992. (Abstract Only).

"Feedback Equalization for Fading Dispersive Channels", P. Monsen, IEEE Transactions on Information Theory, Jan. 1971, pp. 56-64.

Least Square Estimation With Application to Digital Signal Processing, A.A. Giordano and F.M. Hsu, John Wiley and Sons, New York, NY, 1985, Chapter 3.3.

"On Multipath Channel Estimation for CDMA Systems Using Multiple Sensors", C. Sengupta, J.R. Cavallaro, and B. Aazhang, IEEE Transactions on Communications, vol. 49, No. 3, Mar. 2001, pp. 543-553.

"Adaptive Space-Time Feedforward/Feedback Detection for High Data Rate CDMA in Frequency-Selective Fading", J.E. Smee and S.C. Schwartz, IEEE Transactions on Communications, vol. 49, No. 2, Feb. 2001, pp. 317-328.

"Channel Equalization for Block Transmission Systems", G.K. Kaleh, IEEE Journal on Selected Areas in Communications, vol. 13, No. 1, Jan. 1995, pp. 110-121.

"Minimum Probability of Error for Asynchronous Gaussian Multiple-Access Channels", S. Verdu, IEEE Transactions on Information Theory, vol. IT-32, No. 1, Jan. 1986, pp. 85-96.

"Tracking of Time-Varying Mobile Radio Channels—Part I: The Wiener LMS Algorithm", L. Lindbom, M. Sternad, and A. Ahlen, IEEE Transactions on Communications, vol. 49, No. 12, Dec. 2001, pp. 2207-2217.

"Block Channel Equalization in the Presence of a Cochannel Interferent Signal", IEEE Journal on Selected Areas in Communications, vol. 17, No. 11, Nov. 1999, pp. 1853-1862.

"Decision Feedback Equalization for CDMA in Indoor Wireless Communications", M. Abdulrahman, A.U.H. Sheikh, and D.D. Falconer, IEEE Journal on Selected Areas in Communications, vol. 12, No. 3, May 1994, pp. 698-706.

"Blind Adaptive Multiuser Detection", M. Honig, U. Madhow, and S. Verdu, IEEE Transactions on Information Theory, vol. 41, No. 4, Jul. 1995, pp. 944-960.

"Adaptive Receiver Structures for Asynchronous CDMA Systems", P.B. Rapajic and B.S. Vucetic, IEEE Journal of Selected Areas in Communications, vol. 12, No. 4, May 1994, pp. 685-697.

"An Algorithm For Reducing the Bandwidth and Profile of a Sparse Matrix", N.E. Gibbs, W.G. Poole, Jr., and P.K. Stockmeyer, Siam J. Numer.Anal., vol. 13, No. 2, Apr. 1976, pp. 236-250.

"Blind Multiuser Detection: A Subspace Approach", X. Wang and H.V. Poor, IEEE Transactions on Information Theory, vol. 44, No. 2, Mar. 1998, pp. 677-690.

"Performance Analysis of Minimum Variance CDMA Receivers", M.K. Tsatsanis and Z. Xu, IEEE Transactions on Signal Processing, vol. 46, No. 11, Nov. 1998, pp. 3014-3022.

\* cited by examiner

TECHNIQUE FOR ADAPTIVE MULTIUSER EQUALIZATION IN CODE DIVISION MULTIPLE ACCESS SYSTEMS

CROSS-REFERENCE TO RELATED APPLICATION

This application claims priority under 35 U.S.C. 119(e) of U.S. Provisional Application Ser. No. 60/553,779 filed on Mar. 16, 2004, the disclosure of which is incorporated herein by reference.

FIELD OF INVENTION

The present invention relates to Code Division Multiple Access systems and, more particularly, to improvements in such CDMA systems in which adaptive equalization of multiple-antenna received signals is provided by a decision-feedback equalizer for reducing the combination of multiple-access interference and channel distortions.

BACKGROUND OF THE INVENTION

Existing Code Division Multiple Access Systems such as IS-95 and next generation Wideband CDMA (WCDMA) provide multiple user access over radio channels between user terminals such as cellular telephones and base station terminals. The forward link in these systems consists of transmissions from a central station multiple-access transmitter terminal to a multitude of user receiver terminals located within a geographical region or cell. CDMA systems encompass a plurality of cells each with its associated central station. Transmissions to a user receiver terminal may be from more than one central station transmitter thus providing transmit diversity protection. The reverse link in these systems consists of multiple-access transmissions from a multitude of user transmitter terminals located in the cell to a central station receiver terminal. The central station terminal may use multiple antennas for both transmitting and receiving in order to provide diversity protection against multiple-access interference and multipath fading. The user receiver terminal in the forward link may also employ multiple antennas for diversity protection.

CDMA systems may also be combined in a hybrid configuration with Time Division Multiple Access (TDMA) or Frequency Division Multiple Access (FDMA) systems. TDMA shares multiple users in separate time slots, each of which may use CDMA for increased multiple access in the hybrid system. FDMA/CDMA has multiple CDMA sub-bands.

In CDMA systems users employ a communication signal that occupies the entire CDMA frequency band or subband but the users are assigned different code signatures in order to provide multiple access discrimination between users. The different code signatures are produced by modulating user digital data information with Direct-Sequence Spread Spectrum (DSSS) signals. In this modulation successive digital data symbols representing the transmitted information are multiplied by wider bandwidth DSSS signals. The DSSS signals are periodic pseudonoise (PN) sequences that have N chip symbols for each data symbol, i.e., a DSSS spreading factor of N. The PN sequences have cross correlation properties that protect against other user, i.e., multiple-access, interference and autocorrelation properties that protect against multipath effects. The multipath produces, with respect to the digital data symbols, intersymbol interference (ISI) that degrades quality of data symbol detection. Despite the protection provided by the PN sequence correlation properties, multiple-access and multipath interference limit the capacity of present CDMA systems.

At the central station receiver terminal, a multitude of reverse link users are simultaneously processed to recover the originally transmitted information from each of the user transmitter terminals associated with the central station. This central station processing may be accomplished individually for each user with a group of single-user processors or jointly with one or more subgroups of users employing multiuser processors. The multiuser processors provide joint detection of a set of users so as to reduce multiple-access interference and multipath channel distortions. Because of the physical separation between user terminals, user transmitter terminals may not be mutually time synchronized. For this asynchronous reverse link, the signal components associated with different user terminals are not time aligned in the composite received signal. This lack of synchronism includes misalignment of frames of data containing blocks of digital data symbols and misalignment of the boundaries of the digital data symbols. With symbol misalignment the respective PN sequences are also misaligned and the chosen cross-correlation features are not realized. The asynchronous reverse link application complicates the task of joint detection at the central station receiver.

In the forward link at the user receiver terminal, the information for that user alone must be recovered from one or more received signals that are associated with diversity antennas. These received signals result from transmitted signals at one or more central station transmitter terminals. A single-user processor reduces interference from other users and channel distortion effects such as multipath in recovering the user information. In theory joint processors that generate estimates of other user digital data symbols may also be used in the forward link but in practice computational requirements for mobile user receivers preclude joint-user detection. All the users within a cell may be transmitted from a single central station so that the user component signals at the receiver terminal are time synchronized and have been affected by the same channel. Moreover, the user signals in the forward link may be mutually orthogonal. However, the effects of channel multipath will produce multiple-access interference as well as intersymbol interference. In addition, interfering users may be present that are associated with adjacent cells coming from other central stations. These interfering users produce the same asynchronous adjacent-cell frame and symbol boundary mismatches as in the reverse link application.

For the initial CDMA system, IS-95, the conventional single-user processor included a DSSS matched filter/combiner and RAKE subprocessor. The DSSS matched filter/combiner, so called because its transfer function is matched to the complex conjugate of the user DSSS signal transfer function, reduces the interference from other users by combining chip symbols so as to exploit the cross-correlation properties of the PN sequence in the DSSS signal. The RAKE subprocessor is an adaptive transversal filter that collects or "rakes together" multipath signal returns so as to act as a multipath combiner. These conventional systems, however, do not cancel multiple-access interference or intersymbol interference so that multiuser channel capacity becomes limited by this interference.

Interference compensation or cancellation of multiple-access interference significantly improves multiuser capacity in a CDMA system. The optimum system to combat multiple-access interference is the multiuser Maximum-Likelihood Sequence Estimator (MLSE) described by S. Verdú, "Minimum probability of error for asynchronous Gaussian multiple-access channel", IEEE Trans. On Inform. Theory, vol. IT-32, no. 1, pp. 85-96, January 1986. Unfortunately the multiuser MLSE increases exponentially in complexity with the number of users and practical application of this technique is limited to a small subset of the users in a CDMA cell.

Equalizers represent a class of suboptimum solutions for multiuser processors. In linear equalization systems, the received signal is decomposed into multiple dimensions corresponding to the user DSSS signals and each dimension is then linearly weighted to reduce multiple-access interference while maximizing the desired user. In *Linear Multiuser Detectors for Synchronous Code-Division Multiple Access Channels*, R. Lupas and S. Verdu, IEEE Transactions on Information Theory, vol. IT-35, No. 1, pp. 123-136, January 1989, a linear equalization technique called the "decorrelating detector" is shown to reduce multiple-access interference and provide protection when there are both strong and weak user signal strengths. In this article the effects of multipath and methods of adaptation to changing channel conditions are not addressed.

U.S. Pat. No. 5,619,503 describes a multibeam/multiuser cellular system where users are assigned orthogonal frequency/time channels. A linear equalizer is used to reduce interference between users in different cells that are assigned the same orthogonal channel. The linear equalization in U.S. Pat. No. 5,619,503 provides a solution for orthogonal systems such as TDMA or FDMA rather than CDMA and, in addition, does not include intersymbol effects due to asynchronous conditions or multipath.

Equalizers can also include decision-feedback of previous multiuser decisions. In the absence of decision errors a significant performance advantage results relative to linear equalizers. The decision-feedback equalizer (DFE) produces a data symbol estimate by processing received signals and previous decisions derived from detection of previous data symbol estimates. The DFE includes a matched filter, forward filter, and backward filter. The matched filter combines received signals associated with diversity paths and time dimensions. The backward filter processes previous decisions to eliminate past ISI, i.e. ISI due to previous data symbol values. The forward filter processes the matched filter combined signals to reduce interference not cancelled in the backward filter. When the DFE is adapted using a Minimum Mean Square Error (MMSE) criterion there results at the output a balance between the residual interference and enhanced noise thus providing an additional advantage over the decorrelating detector. U.S. Pat. No. 4,328,585 describes a single-user decision-feedback equalizer that includes an adaptive matched filter and a lattice filter realization of the forward and backward filters. An example of a decision-feedback equalizer in the presence of multiple-access interference was given in *MMSE Equalization of Interference on Fading Diversity Channels*, P. Monsen, IEEE Trans. Commun., vol. COM-32, No. 1, pp. 5-12, January 1984, (hereafter referred to as MMSE Equalization and incorporated herein by reference). In MMSE equalization a minimum mean square (MMSE) DFE was used to reduce both undesired interference and multipath interference for an unknown interference environment, i.e., no knowledge of the transmitted interfering signal parameters was assumed at the receiver. In *Decision-Feedback Equalization for CDMA in Indoor Wireless Communications*, M. Abdulrahman, A. U. H. Sheikh, and D. D. Falconer, IEEE J. on Selected Areas Commun., vol. 12, pp. 698-707, May 1994, knowledge of only the desired user signal parameters is required. Described results were limited to a four-user system with a DSSS spreading factor of eight.

It is intuitive that exploiting the knowledge of the other-user DSSS signals will result in improved interference reduction for those users. A multiuser DFE that includes multiple antennas, asynchronous operation, and exploits knowledge of the in-cell DSSS signal parameters is described in *Adaptive Space-Time Feedfoward/Feedback Detection for High Data Rate CDMA in Frequency-Selective Fading*, J. E. Smee and S. C. Schwartz, IEEE Trans Commun., vol. 49, No. 2, February 2001. The simulation of this system also employed a spreading factor of eight in which eight users could be supported. Adaptation, however, even with a recursive least squares adaptation algorithm, required a training period of 200 to 500 data symbols for convergence.

Rather than use training sequences or previous decisions to adapt the equalizer as described in the above mentioned prior art, another approach is to attempt to first measure the channel characteristics and then use these characteristics to calculate the equalizer parameters. This technique is generally called block equalization because it operates over a block of data for which it is assumed that the channel is approximately constant. In *Channel Equalization for Block Transmission Systems*, G. K. Kaleh, IEEE J. on Sel. Areas in Comm., vol. 13, No. 1, January, 1995, zero forcing and MMSE block DFEs are derived for the single dispersive channel with intersymbol interference. The results showed better performance with less complexity for the block method vs. conventional equalization. In another TDMA/FDMA application in *Block Channel Equalization in the Presence of a Cochannel Interferent Signal*, A. Ginesi, M. Vittetta, and D. D. Falconer, IEEE J. on Sel. Areas of Comm., vol. 17, No. 11, November 1999, a block DFE is derived that combats multipath induced ISI and cochannel interference in the presence of a single interferer. The block DFE is shown to outperform the conventional DFE but at a cost of greater complexity. These block equalization prior art examples do not include techniques to reduce non-stationary channel effects in block equalization. They also do not exploit known interference characteristics such as the PN sequence signatures in CDMA. Block equalization as described in the above articles simultaneously finds estimates for all the symbols in the block so its complexity grows with the block length. In contrast a symbol-by-symbol equalizer can be used to find one symbol estimate after the other within a receiver time block with complexity that grows with the channel duration and not the block length. A block symbol-by-symbol decorrelation detector for a CDMA application is described in *On Multipath Channel Estimation for CDMA Systems using Multiple Sensors*, C. Sengupta, J. R. Cavallaro, and B. Aazhang, IEEE Trans. On Comm., vol. 49, No. 3, March 2001. The decorrelation detector does not compensate for ISI and results in enhanced noise in the cancellation of the multiple-access interference. In U.S. patent application Ser. No. 09/980,416, filed Feb. 4, 2002, an adaptive processor operating with coding/interleaving is used to reduce multiple-access interference at a multibeam receiver in a synchronous TDMA/FDMA application. Interference is reduced such that orthogonal channels can be reassigned without channel management to achieve 100% reuse of the channel in all beam coverage regions. In one embodiment the adaptive processor is realized with a combination of an adaptive matched filter and a block symbol-by-symbol linear equalizer.

In contrast to a decision-feedback equalizer a decision-feedback detector not only cancels interference from previous decisions of other users but also cancels interference due to the current symbol for some of the users. This technique for interference reduction requires that the other user interference be estimated and subtracted from the received signal in a successive cancellation scheme that eliminates interfering users in a sequence from larger to smaller in received power rank. Examples of these successive cancellation schemes include *Decorrelating Decision-Feedback Multiuser Detector for Synchronous Code-Division Multiple Access Channels*, A. Duel-Hallen, IEEE Trans. Commun., vol. COM-41, No. 2, pp. 285-290, February 1993, (hereafter denoted as Decorrelating Detector), *Adaptive Receiver Structure for Asynchronous CDMA Systems*, P. Rapajic and B. Vucetic, IEEE Journal on Selected Areas of Communication, vol. 12, No. 4, pp. 685-697, May 1994, and *A Family of Multiuser Decision-Feedback Detectors for Asynchronous Code-Division Multiple Access Channels*, A. Duel-Hallen, IEEE Trans. Commun., vol. 42, Nos. 2, 3, 4, February-April 1995. These systems as noted in Decorrelating Detector at page 287, require a rank order of feedback-interference cancellation because "our analysis indicate that feedback is primarily beneficial when interfering users are stronger". It is anticipated that under conditions when the received signals are about the same level in received power and there are many users, interference estimation errors and subsequent error propagation will preclude successful cancellation with these methods. In a CDMA system with a large number of power controlled users in a reverse link application one would expect many received signal user components to have approximately the same power levels.

For either equalization or successive cancellation techniques, there is a requirement for processing a very large number of parameters. For example if there are K users, D diversity antennas, and M multipath returns per diversity antenna, the equalizer must adapt and process KMD dimensions. In future third generation systems such as WCDMA, typical values for these parameters are K=128, D=2, and M=4 or 1024 dimensions. Although the theoretical solutions for multiuser processors are well known, their application with a large number of dimensions is an open area of research.

In equalization when the number of dimensions are large, the adaptation can be very slow when a conventional least-mean squares (LMS) algorithm is applied. An LMS tracking algorithm for mobile radio channels is described in "*Tracking of Time-Varying Mobile Radio Channels. Part I: the Weiner LMS algorithm*", L. Lindbon, M. Sternad, A. Ahlen, IEEE Trans. Commun., vol 49, December 2001. Faster adapting solutions such as Kalman filters require considerably more complexity and are subject to parameter estimation errors. One such technique is described in "*Square Root Kalman Filtering for High-Speed Data Received over Fading Dispersive HF Channels*", F. M. Hsu, IEEE Trans.on Info. Theory, vol. 41, no. 4, pp. 944-960, September 1982.

An alternative to large dimension equalization is blind equalization wherein the adaptation does not attempt to track and utilize all dimensions. Examples of blind equalization are given in "*Blind Adaptive Multiuser Detection*", M. Honig, U. Madhow, and S. Verdu, IEEE Trans. on Info. Theory, vol. 41, no. 4, pp. 944-960, July 1995, "*Performance Analysis of Minimum Variance CDMA Receivers*", M. Tsatsanis and Z. D. Xu, IEEE Trans. on Sig. Processing, vol. 46, no. 11, pp. 3014-3022, November 1998., "*Blind Multiuser Detection: a subspace approach*", X. Wang and V. H. Poor, IEEE Trans. on Info Theory, vol. 44, no. 2, pp. 677-690, March 1998. Because of the blind nature of the algorithm, the convergence time can still be long and their resulting performance may be significantly degraded from a solution where the parameters are known or have been accurately estimated.

Next generation systems such as WCDMA will employ larger bandwidths so that both the number of users and the number of multipath interferers will increase relative to present systems. Techniques that cope with multiple-access and multipath interference will require processing of a very large parameter set. Higher data rates used in the next generation systems may have less spread spectrum gain in some applications, so that ISI caused by multipath effects will increase. WCDMA systems will also support multiple data rates further increasing the potential for interference from higher power, higher data rate users into lower power, lower data rate users.

Although the techniques described above have been used for improving quality in multipath fading systems with multiple-access interference, it has been recognized that optimum MLSE techniques are too complex for implementation, decorrelation detectors enhance noise and do not eliminate ISI, techniques that do not exploit known parameters of the interfering signals are limited in performance, successive cancellation techniques have performance limitations due to error propagation, the large number of dimensions in a wideband CDMA application result in performance limitations under changing conditions due to convergence difficulties, and the presence of multiple data rates in WCDMA complicates the task of equalization of mutual interference.

SUMMARY OF THE INVENTION

Figure 1:
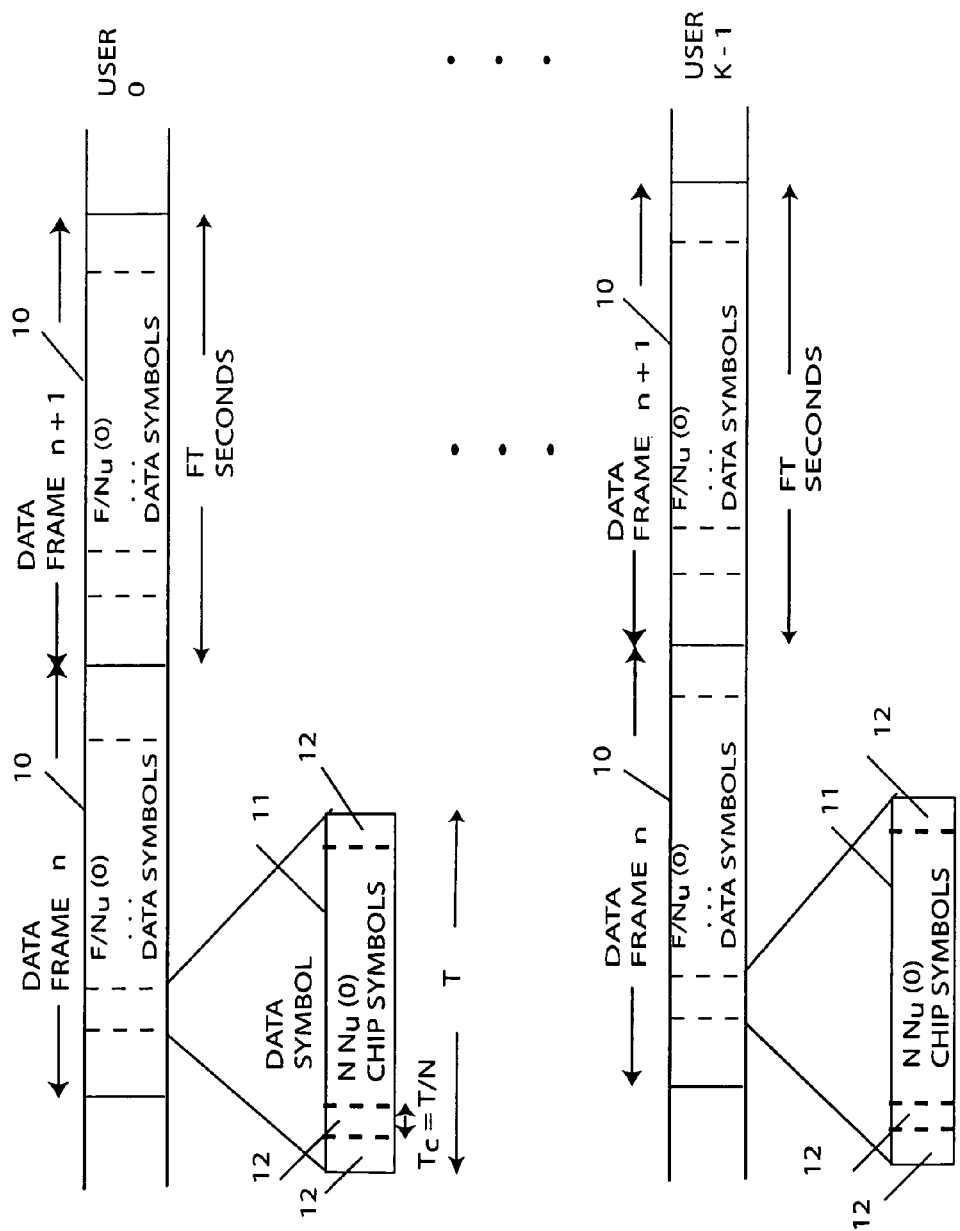
FIG. 1 is a diagram of the frame and symbol structure for a K=user system.

With the foregoing background in mind, it is an object of the invention to provide, for a code division multiple access system, a method and receiver with adaptive decision-feedback equalization of both multiple-access and intersymbol interference under conditions where the number of equalization parameters is very large.

Another object of the invention is to provide a block symbol-by-symbol equalization approach that uses reference data for channel estimation followed by direct calculation of equalizer parameters so as to provide faster convergence and improved quality of recovered user information relative to adaptive equalization techniques that attempt to directly estimate the equalizer parameters.

Another object of the invention is to protect against both multiple-access interference and intersymbol interference in multiple data rate CDMA systems that operate in either synchronous or asynchronous modes in both forward link (central station to mobile user) and reverse link (mobile user to central station) applications and where some but not necessarily all of the users are detected for purposes of past ISI cancellation. In providing protection against multiple-access interference in cellular systems it is also an object of the invention to consider adjacent cell as well as same cell interference.

Still another object of the invention is to employ numerical techniques that will reduce processor computational rate requirements when the number of equalizer parameters is very large.

The foregoing and other objects are achieved in a code division multiple access system with a plurality of users wherein a user employs interleaving and forward error correction (FEC) coding of user digital data information to provide a sequence of digital data symbols at a symbol rate of $1/N_U T$ symbols/second. The integer $N_U$, $N_U \geq 1$, allows users to employ data rates that are lower than the system rate $1/T$ corresponding to the maximum user data rate. The digital data symbols are modulated with Direct-Sequence Spread Spectrum (DSSS) signals that have a DSSS symbol rate of N/T where N is the number of DSSS symbols per data symbol at the maximum user data rate. By generating the data rates using an integer multiple of the system period T the number of DSSS symbols for any user will be an integer. The modulated digital data symbols are transmitted over channels with multiple user and multipath interference to a receiving terminal with one or more diversity antennas. In the receiving terminal a decision-feedback equalizer (DFE) processes received signals from the diversity antennas within a receiver time block to produce multiuser subsymbol estimates in successive subdecision intervals of length T seconds within a data frame of FT seconds. Subsymbol estimates are produced for a set of λ detected users where $1 \leq \lambda \leq K$ and K is the number of mutually-interfering users processed in the DFE. Since the transmitted digital data symbol can be $N_U$ times longer than the subdecision interval, the multiuser subsymbol estimates represent values that are closest in a mean-square error sense to fractional portions of the transmitted digital data symbols. Additionally, the DFE subsymbol estimates are combined to produce symbol estimates that are subsequently forwarded to a deinterleaver and error correction decoder to produce decoded symbol values representative of the transmitted digital data information for each of the λ users. The symbol estimates are also detected by selecting the closest possible transmitted digital data symbol value to produce λ user decisions for the user decision interval. These user decisions are partitioned into subdecisions that are employed in the DFE in subsequent subdecision intervals to cancel interference due to previous user symbols associated with the λ detected users. Interference reduction for the $\mu=K-\lambda$ users that are not detected is accomplished with only linear processing in the DFE. The DFE is adapted for successive receiver time blocks to changing conditions by recalculating its parameters using estimated channel parameters and the known user DSSS signal sequences. The invention embodiments include a reverse link application wherein geographically separate user transmitting terminals, e.g. mobile cellular telephones, transmit to a receiver at a central station, e.g. a cellular base station, and a forward link embodiment wherein the user transmitting terminals are collocated at a central station and the receiving terminal is within a cell region associated with the central station.

Estimation of channel parameters is accomplished by generating reference replicas of reference data in the receiver, correlating the received diversity signals with the reference replicas to form coarse channel estimates, and subsequently multiplying these coarse estimates by a correction matrix to obtain the channel estimates. The reference data may be inserted within transmitted signals leading to a reference-directed estimation or in a decision-directed estimation the reference data consists of previously detected symbols. The reverse link can employ either decision-directed techniques or the use of a transmitted reference for estimating channel parameters. In a forward link application separate pilot transmitting terminal at a central station may be used for sending a CDMA reference channel. In a reverse-link reference-directed embodiment the DSSS modulated digital data symbols are time-division multiplexed with reference data that is unique to each user. In this embodiment the reference data consists of known digital data symbols that are subsequently modulated with the same DSSS signal as used with the unknown digital data symbols. In a decision-directed embodiment the reference data include previous decisions that are detected values of the sum of equalizer subsymbol estimates. These decisions are DSSS modulated to produce the reference data. In a CDMA forward link application the reference data are known digital data symbols that are DSSS modulated with a code sequence that has small correlation with the DSSS signals employed by the forward link users. For channel estimation in the forward-link reference-directed embodiment a replica of the known digital data symbols transmitted by the pilot transmitting terminal is used as the reference data.

The DSSS signals are produced by Pseudo-Noise (PN) codes that protect against multiple-access and multipath interference. In the forward link embodiment the PN codes have a period that is either equal to or longer than the user data symbol period. In the long PN code embodiment of the forward link the PN codes are different for each successive data symbol. In the reverse link embodiment the PN codes have a short period equal to the data symbol period of the user. The short period PN code embodiment has application in the WCDMA reverse links in IS-95 forward links and in TDMA/CDMA reverse and forward links. The long period PN code embodiment has application in the forward link of WCDMA systems.

At the receiver terminal, the received signals from each of the diversity antennas are converted from radio frequency signals to diversity received signals that are in a digital data format for digital signal processing. Preferably the received diversity signals are sampled at an integer multiple Q, Q>1, of the DSSS symbol rate. This results in what is called fractional tap spaced equalization that is much less sensitive to timing synchronization errors and variations in multipath delay. The receiver generates local versions or replicas of the K mutually-interfering DSSS signals and also generates reference data signals for each channel to be estimated. The received diversity signals along with the DSSS and reference replicas are used in the subsequent channel estimation of multiple-access and multipath parameters. In addition to estimating channel parameters, the DSSS replicas are formatted to produce a set of sequence signals. The channel parameters and the sequence signals are used in the calculation of equalization parameters that are subsequently used in the equalization of the received diversity signals.

The decision-feedback equalization technique at the receiving terminal processes received signals within a time block to produce T-duration subsymbol estimates corresponding to fractional parts, i.e., subsymbols, of user digital data symbols within a data frame. The DFE operates as if all the K mutually-interfering users were transmitting at the highest possible rate of 1/T. The subsymbol estimates are combined to produce symbol estimates that are subsequently forwarded to a deinterleaver and error correction decoder to produce decoded symbol values representative of the transmitted digital data information for a set of $\lambda \leq K$ users. The block symbol-by-symbol equalization technique in the present invention includes channel estimation of multiple-access and multipath parameters, calculation of equalizer parameters from the channel estimation parameters, and processing of received signals with the calculated equalizer so as to produce successive multiuser subsymbol estimates. In this concept a block length is selected that is sufficiently short that the channel parameters are adequately stable for an equalizer calculation to be applied to the entire block but the length is also long enough such that the estimation and equalization calculations can be repeated each block. Block calculations in this concept are independent so that occasional abrupt changes in channel parameters or general nonstationary channel conditions can be mitigated by combining the block equalization concept with an appropriate interleaving length and error correction coding. Symbol estimates from infrequent "bad" frames resulting from abrupt parameter changes will be combined with "good" symbol estimates after deinterleaving so that subsequent FEC decoding will result in performance robustness with respect to these channel changes.

The block decision-feedback equalizer in the invention is composed of a matched filter, forward filter, and backward filter. The matched filter further includes: (1) a sequence matched filter that matches the received signals with PN sequence signals associated with K>1 users to produce sequence matched signals, and (2) a channel matched filter that matches the sequence matched signals with estimated channel parameters to produce channel matched signals. For each subdecision interval the matched filter utilizes $v+P+1$ received subsymbol epochs of duration T seconds where P is the number of "future" epochs and $v$ is the number of "past" epochs. The present received subsymbol epoch corresponds to the first received subsymbol epoch where there is significant received energy associated with the subsymbols to be estimated. This subsymbol epoch is the subdecision interval for these estimated subsymbols. Future (past) received subsymbol epochs are offset later (earlier) in time by the subsymbol duration of T seconds. The matched filter produces $v+P+1$ channel matched signal components corresponding to subsymbol offsets relative to the subdecision interval. These components are processed by the backward filter to cancel interference from previous detected symbols. The output of the backward filter consists of equalization signals that are also offset by subsymbol delays and advances in time relative to the subdecision interval. The forward filter processes these equalization signals to produce the subsymbol estimates in the subdecision interval. The forward filter is partitioned into an anticausal component that has $P+1$ matrix weights that process present and future equalization signals associated with K users and a causal component that has $v$ past matrix weights that process past equalization signals associated with $\mu=K-\lambda$ users. This structure is designated as a $(v,P)$ DFE.

In the present invention there may be $K_0$ users within a cell and $K_1$ users in adjacent cells all providing mutual interference at the receiver where the digital data information for $\lambda \leq K_0 + K_1$ users is to be recovered. In the reverse link embodiment if $K_1 << K_0$ there is no significant increase in complexity if all $K=K_0+K_1$ are detected at the central station rather than a more conventional approach of ignoring the adjacent cell interference from the $K_1$ users. For the full DFE, $\mu=0$, in this reverse link application, the lowest complexity (0,1) DFE would have the forward filter process K present equalization signals with no symbol delay; and K future equalization signals with a symbol delay of minus one symbol. Because of complexity constraints in the forward link receiver with the long PN code period, the number of detected users $\lambda$ in the invention should be much less than $K_0$ the number of mutually-interfering users within the same cell. Interference in this example is reduced in the forward filter for $K=K_0+K_1$ interferers and reduced in the backward filter for $\lambda$ users. For a (1,1) DFE the forward filter would process $\mu$ past equalization signals with a symbol delay of one symbol, K present equalization signals with no symbol delay; and K future equalization signals with a symbol delay of minus one symbol.

The DFE in this multiuser application reduces multiple-access interference and intersymbol interference associated with K mutually interfering users. By exploiting detected symbol values for a subset of $\lambda$ users, enhanced interference reduction is realized relative to linear equalization of K users.

Calculated equalizer filter parameters are used in the forward and backward filters of the DFE These equalization filter parameters are calculated from the channel parameters and the sequence signals derived from the DSSS replicas. The calculation is accomplished so as to minimize a mean square error function where the error is the difference between the DFE subsymbol estimate and the corresponding transmitted data subsymbol. Forward filter vectors are extracted from the columns of the inverse of a correlation matrix. The correlation matrix is computed as the Hermetian square of a transmittance matrix plus an identity matrix appropriately scaled by an estimate of the additive noise power. The invention includes finding the inverse of this matrix by means of a Cholesky decomposition and also through a sparse matrix calculation.

The invention includes DFE embodiments for both the long PN code period where the DFE must be recalculated for each symbol epoch and the short PN code period where DFE updates are only required max $N_U$ times per data frame. In the long PN code embodiment the forward filter vector is calculated using a power series expansion so as to avoid a matrix inversion calculation for every symbol interval.

DETAILED DESCRIPTION OF THE INVENTION

A multiuser system is described that employs block symbol-by-symbol decision-feedback equalization to reduce multiple-access and multipath interference in a multiple data rate, synchronous or asynchronous CDMA system with a plurality of users. The invention embodiments include a reverse link application wherein geographically separate user transmitting terminals, e.g. mobile cellular telephones, transmit to a receiver at a central station, e.g. a cellular base station, and a forward link application wherein the user transmitting terminals are collocated at a central station and the receiving terminal is within a cell region associated with the central station. Channel estimation in these link embodiments is accomplished with either a referenced-directed or decision-directed embodiment. The invention embodiments also include (1) a short PN code period with application in WCDMA reverse links, in IS-95 forward links, and in TDMA/CDMA reverse and forward links and (2) a long PN code period with application in the forward link of WCDMA systems.

Multiple data rates in the CDMA application are accommodated in the invention by the use of a system data rate that corresponds to the largest user data rate. This system data rate, which corresponds to the data rate after error correction coding and interleaving have been added, has a defined system period of T seconds and a data rate of $1/T$ symbols/second. All user data rates (after error correction coding and interleaving) have symbol periods that are integer multiples of the system period. The equalization system operates at the system data rate in forming multiuser subsymbol estimates with reduced multipath and multiple-access interference. For detection of user symbols for interference cancellation in the DFE, the detection requires that the subsymbol estimates be combined such that there is sufficient signal-to-noise ratio in the detection process. The symbol decision is a quantized value of the subsymbol estimate sum. For purposes of interference cancellation, the symbol decisions are partitioned into subsymbol decisions of length T because the equalization system operates as if all users were transmitting at the same data rate.

In the invention a user in the CDMA system employs interleaving and forward error correction (FEC) coding of user digital data information to provide a sequence of digital data symbols at a symbol rate of $1/N_U T$ symbols/second. The integer $N_U$, $N_U \geq 1$, allows users to employ data rates that are lower than the system rate $1/T$ corresponding to the maximum user data rate. The digital data symbols are modulated with Direct-Sequence Spread Spectrum (DSSS) signals that have a DSSS symbol rate of $N/T$ where N is the number of DSSS symbols, e.g. complex chip samples for QPSK, per data symbol at the maximum user data rate. The spread spectrum processing gain is this number N of DSSS symbols in the system period of T seconds. For a minimal CDMA system with no diversity and no multipath, singular solutions for the DFE forward filter will occur if the number of mutually interfering users K that are processed for interference reduction in the DFE exceed this spread spectrum processing gain N. With diversity antennas and with multipath conditions K can be larger than N. For multiple user data rates, the data rates are selected using an integer multiple of the system period T so that the number of DSSS symbols for any user will be an integer. The DSSS signals are pseudonoise (PN) sequences that may have period equal to or longer than the symbol period $N_U T$. The modulated digital data symbols are transmitted over channels with multiple user and multipath interference to a receiving terminal with one or more diversity antennas.

FIG. 1 shows a general frame structure for a CDMA cellular system with a set of K users numbered from 0 to K−1. These K users will produce mutual interference as a result of transmission over the multiple-access and multipath channel. In general these K users may be all the users in a cell, a subset of the users in the cell, or a combination of in-cell and out-of-cell users. A data frame 10 contains $F/N_u$ digital data symbols representing user digital data information that has been interleaved and error-correction coded. The user digital data symbol rate for the kth user is $1/TN_u(k)$. For the system period of T seconds the minimum frame duration is FT seconds. In practice, the data frame 10 may contain additional symbols not shown in FIG. 1, e.g. synchronization, adaptation, or control symbols, or guard symbols between frames. In the reverse-link reference-directed embodiment the data frame contains known reference data that is inserted in with the digital data symbols. The known reference is preferably inserted near the center of the frame, in what is referred to as a midamble, in order to minimize the effects of channel variation. In the forward link embodiment the reference data consists of known digital data symbols transmitted by a pilot transmitting terminal at a central station. The known reference data is reproduced at the receiver and subsequently used for channel estimation. The data symbols 11 are each modulated by a Direct Sequence Spread Spectrum (DSSS) signal composed of N $N_u(k)$ successive chip symbols 12. The DSSS signal is a pseudonoise sequence that is different for each user. In a short PN code embodiment, the PN sequence has period $N_u(k)T$ seconds so that it repeats itself for each successive data symbol. The length of the chip symbol 12 is $T_c = T/N$ so there are an integer number of DSSS symbols for each user data rate. While repeating from symbol to symbol within a frame, different repeating PN sequences may be used in a subsequent transmitter frame. The short PN code application is found on the reverse link in WCDMA, the forward link in IS-95, and on both the reverse and forward links in TDMA/CDMA systems. In the long PN code embodiment, the user PN code period is much greater than the user data symbol period $N_U T$ so that succession data symbols do not have the same DSSS modulation. The long PN code application is found in the forward link in WCDMA. The PN sequences for a set of physically separated users in a reverse link configuration are usually quasi-orthogonal. In a forward link configuration at the central station transmitter, the PN sequence may be either quasi-orthogonal or orthogonal. In the latter case multiple-access interference is produced in the channel by multipath effects that destroy the transmit mutual orthogonality.

Figure 2:
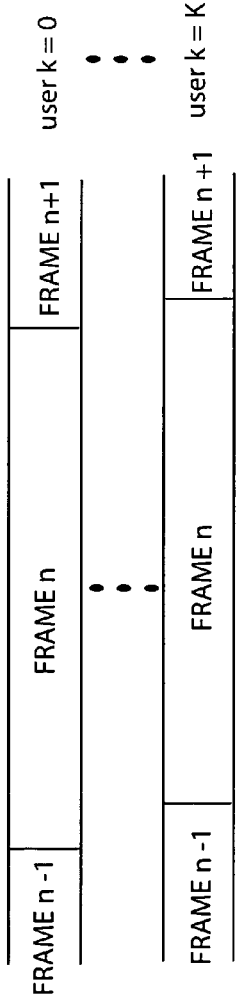
FIG. 2 is a diagram of receiver frames and associated start times of component user frames.
Figure 2:
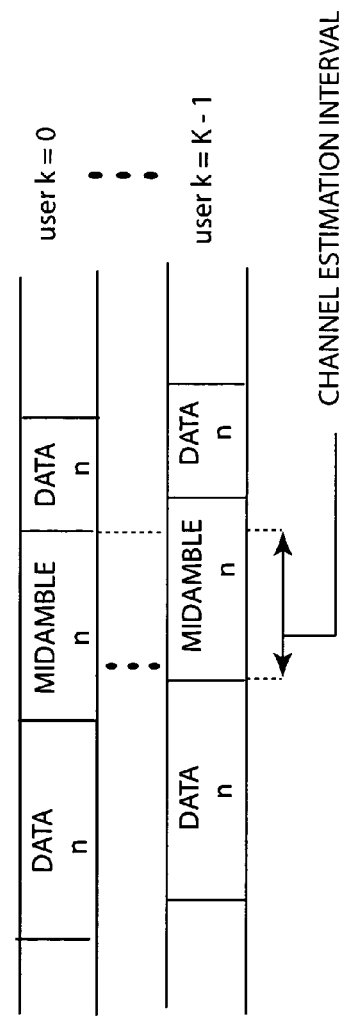

In synchronous systems the user transmitter terminals within a cell may employ synchronization to advance or delay the data frame and data symbol boundaries so that at the receiver there is time alignment of these boundaries for all users in the cell. In asynchronous operation the received signal contains user signal components are not time aligned at a receiver antenna. This time misalignment is typically a few symbols in duration but a small fraction of the frame duration. FIG. 2 is a diagram of the received signal time line for the signal component due to the earliest arriving user, denoted user 0, and the signal component due to the latest arriving user, denoted user K−1. At the receiver the processing is based on a receiver frame that is independent of transmitted frames time shifted by user asynchronous effects. The receiver frame is aligned with the data frame for the earliest arriving user signal. With this approach the last few digital data symbols in the (n−1)th frame and all but the last few digital data symbols in the nth frame are estimated by the DFE in receiver frame n for user K−1. For the decision-directed embodiment in FIG. 2A, previous user decisions from receiver frame n−1 are used for channel estimation and subsequent equalization parameter calculation for the DFE estimation in receiver frame n. For channel estimation of K channels in the reverse link, a complete set of K-user reference data is required. Thus only the portions of frame n−1 that overlap over the K-user set can be used in the decision-directed channel estimation. Note that the channel must remain approximately constant over two receiver frames. The receiver frame duration can be selected long enough to provide enough decisions for channel estimation but short enough to insure channel stationarity over two receiver frames. In this decision-directed embodiment new users are introduced to the system with a preamble that is generally at least as long as the receiver frame so that initial channel estimation with the new user present will be able to use known digital data symbol values for that user. Again because of the requirement for a complete K-user set of reference data for channel estimation, the reference-directed midamble embodiment uses reference data from the time interval of the overlapping portion of the K-user midambles as shown in FIG. 2(B).

In the receiving terminal a decision-feedback equalizer processes received signals from the diversity antennas within a receiver time block to produce multiuser subsymbol estimates in successive subdecision intervals of length T seconds within a data frame of FT seconds. The transmitted digital data symbol can be $N_U$ times longer than the system decision interval. Thus the multiuser subsymbol estimates represent values that are closest in a mean-square error sense to fractional portions of the transmitted digital data symbols. The subsymbol estimates are produced for a set of λ detected users where $1 \leq \lambda \leq K$ and K is the number of mutually-interfering users processed in the DFE. For these λ users there is full DFE interference reduction while the interference reduction for the $\mu=K-\lambda$ users that are not detected is accomplished with only linear processing in the DFE. The DFE is adapted in successive receiver time blocks to changing conditions by recalculating its parameters.

The block DFE in the invention includes a matched filter, forward filter, and backward filter. The matched filter further includes: (1) a sequence matched filter that matches the received signals with PN sequence signals associated with K>1 users to produce sequence matched signals, and (2) a channel matched filter that matches the sequence matched signals with estimated channel parameters to produce channel matched signals. For each subdecision interval the matched filter utilizes ν+P+1 received subsymbol epochs of duration T seconds where P is the number of "future" epochs and ν is the number of "past" epochs. The present received subsymbol epoch corresponds to the first received subsymbol epoch where there is significant received energy associated with the subsymbols to be estimated. This symbol epoch is the subdecision interval for these estimated subsymbols. Future (past) received subsymbol epochs are offset later (earlier) in time by the subsymbol duration of T seconds. The matched filter produces ν+P+1 channel matched signal components corresponding to subsymbol offsets relative to the subdecision interval. These components are processed by the backward filter to cancel interference from previous detected symbols. The output of the backward filter consists of equalization signals that are also offset by subsymbol delays and advances in time relative to the subdecision interval. The forward filter processes these equalization signals to produce the subsymbol estimates in the subdecision interval. The forward filter is partitioned into an anticausal component that has P+1 matrix weights that process present and future equalization signals associated with K users and a causal component that has ν past matrix weights that process past equalization signals associated with $\mu=K-\lambda$ users. This structure is designated as a (ν,P) DFE.

Good equalization performance is realized if the DFE parameter P is chosen equal to the number of intersymbol interferers produced by the multipath effects. CDMA systems typically use data symbols that are long relative to multipath delays so that only the previous symbol produces interference. Thus a typical application would use the minimum configurations of ν=0, P=1 forward filter matrix weights for complete joint detection, i.e. λ=K, and ν=P=1 forward filter matrix weights for $1 \leq \lambda < K$.

Figure 3:
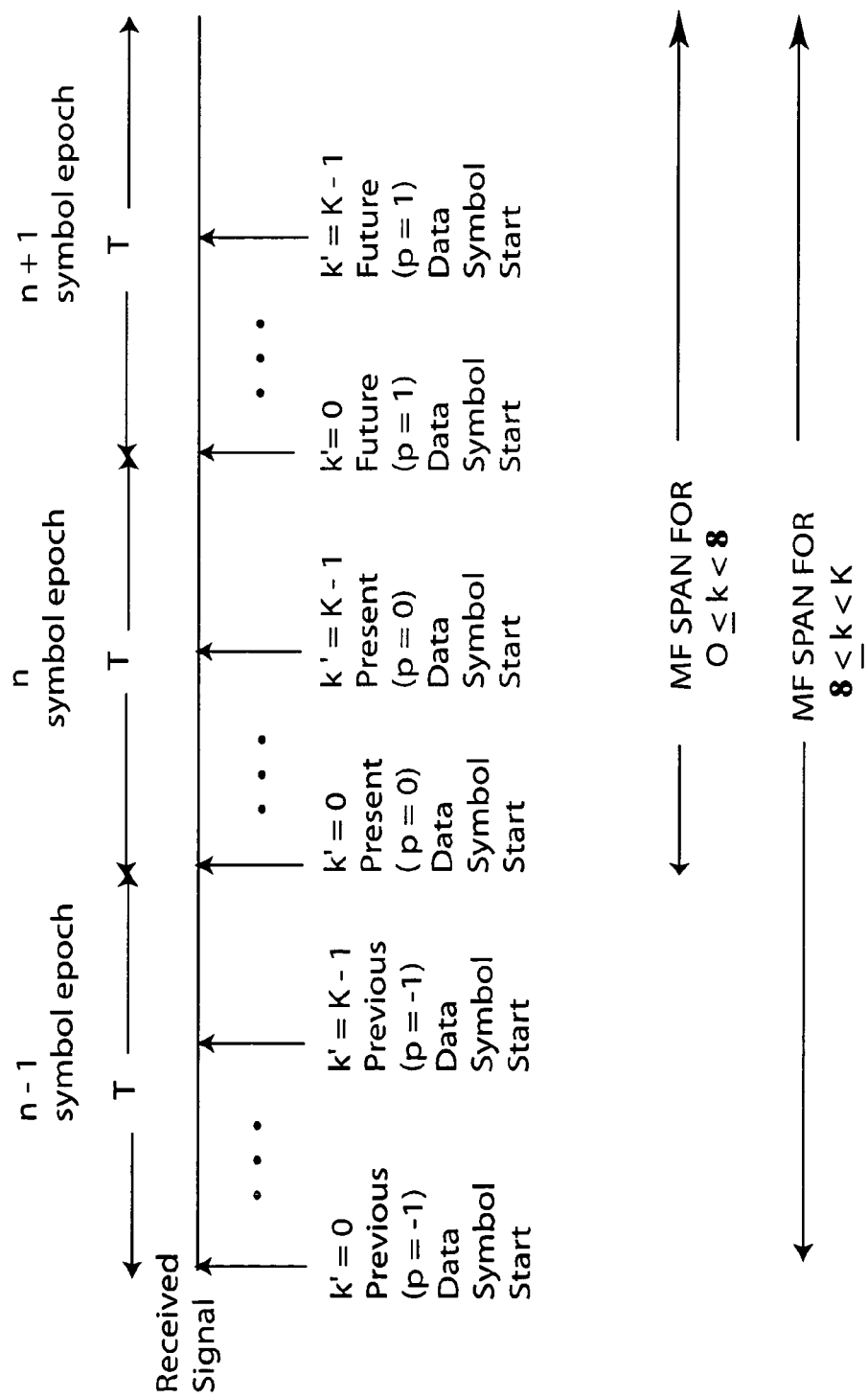
FIG. 3 is a diagram of received symbol epochs and associated start times of component user symbols.

An additional asynchronous effect occurs with the alignment of the data symbols. FIG. 3 is an example of a K user system with all users at the system data rate 1/T and a (ν=1, P=1) DFE. In this figure the start times are shown for data symbols in the user signal components in the received signal. Again the users have been numbered consecutively by the arrival time of the data symbol boundary, i.e., the k'=0 signal component is synchronized to the received symbol start time and user signal data symbol k'=1 arrives at the same time or later as user signal data symbol k'=0. The DFE includes a matched filter that processes received signal components to produce channel matched signals corresponding to each user. For users in the joint detection group, $0 \leq k \leq \lambda-1$, the channel matched signals are derived from a matched filter (MF) span of P+1 data symbols. For users outside of the joint detection group, $\lambda \leq k \leq K-1$, the channel matched signals are derived from a MF span of ν+P+1 data symbols. When users are not aligned synchronously as shown in FIG. 3 for the example for ν=P=1, the MF span for processing begins (ends) at the start (finish) of a symbol corresponding to the earliest arriving user. Thus as shown in FIG. 3 for detection of the nth data symbol of the λ users, the MF span for $0 \leq k \leq \lambda-1$ include the n and n+1 received symbol epochs and the MF span for $\lambda \leq k \leq K-1$ includes the n-1, n and n+1 received symbol epochs.

Figure 4:
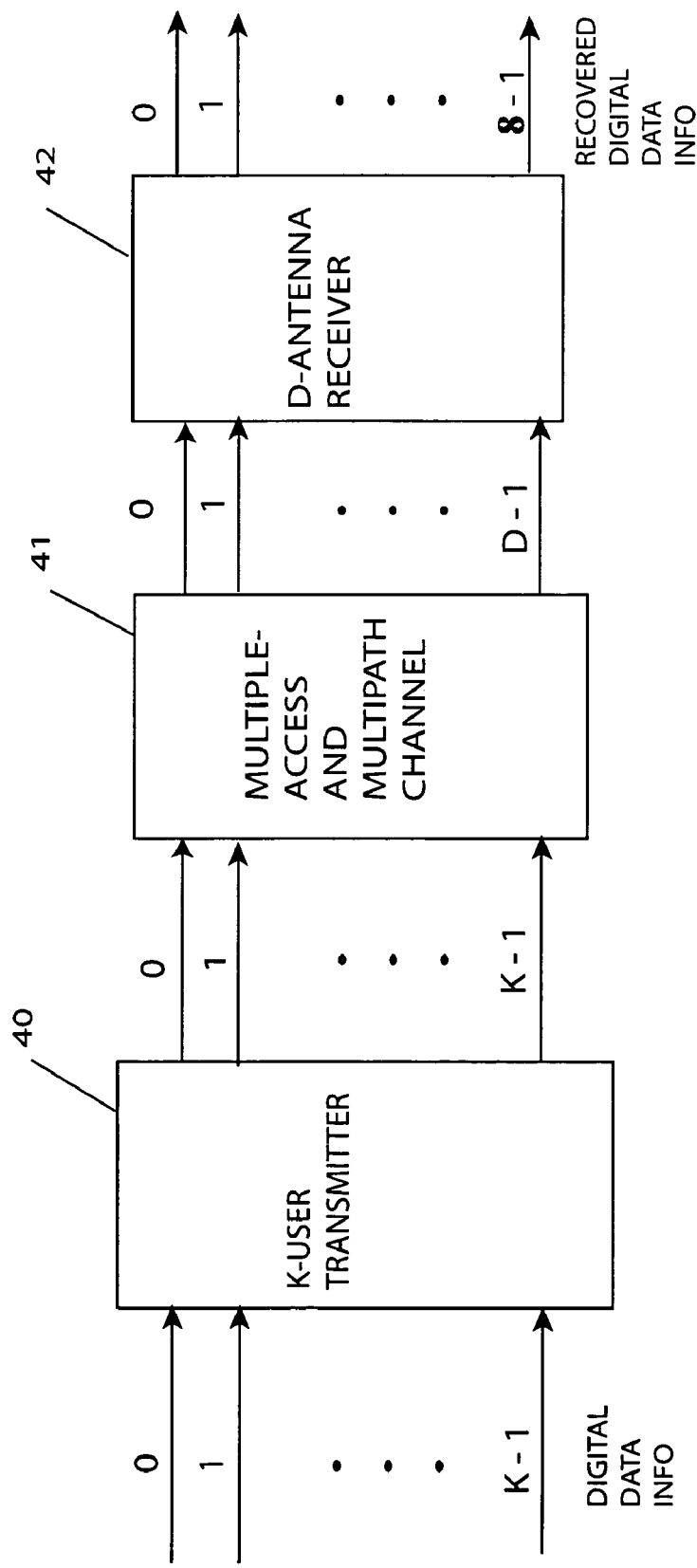
FIG. 4 is a block diagram of a system with multiuser transmission and reception.

A general multiuser system is shown in FIG. 4 where a set of users, K>1, each have digital data information to be conveyed over communication links. This invention applies to both reverse links from physically separated users to a central station multiuser receiver and forward links from a central station multiuser transmitter to physically separated user receivers. The present invention also applies to a single cell application with K jointly processed users or a multicell application where the total number of processed users corresponding to multiple cells is K. In FIG. 4 in the reverse link the K-user transmitter 40 typically corresponds to handsets and in the forward link the transmitter 40 typically combines multiple user transmissions using a single amplifier and antenna. During hand-off conditions or with transmit diversity, the forward link has multiple transmitter systems. Digital data information for each of K users is applied to transmitter 40 in FIG. 4 and subsequently sent to a multiple-access and multipath channel 41. This channel results in interference between user signals and interference caused by multiple paths with delay differences. Asynchronous user terminals also result in delay differences. At the receiver 42 the outputs of the channel are collected at $D \geq 1$ receiving antennas and the receiver 42 generates recovered digital data information associated with a subset $\lambda \leq K$ transmitting users. In the reverse link receiver at the central station the recovered information is associated with λ users where λ is much greater than unity. In the forward link receiver (handset) the recovered information is typically associated with a small number of users, i.e., λ<<K.

Figure 5:
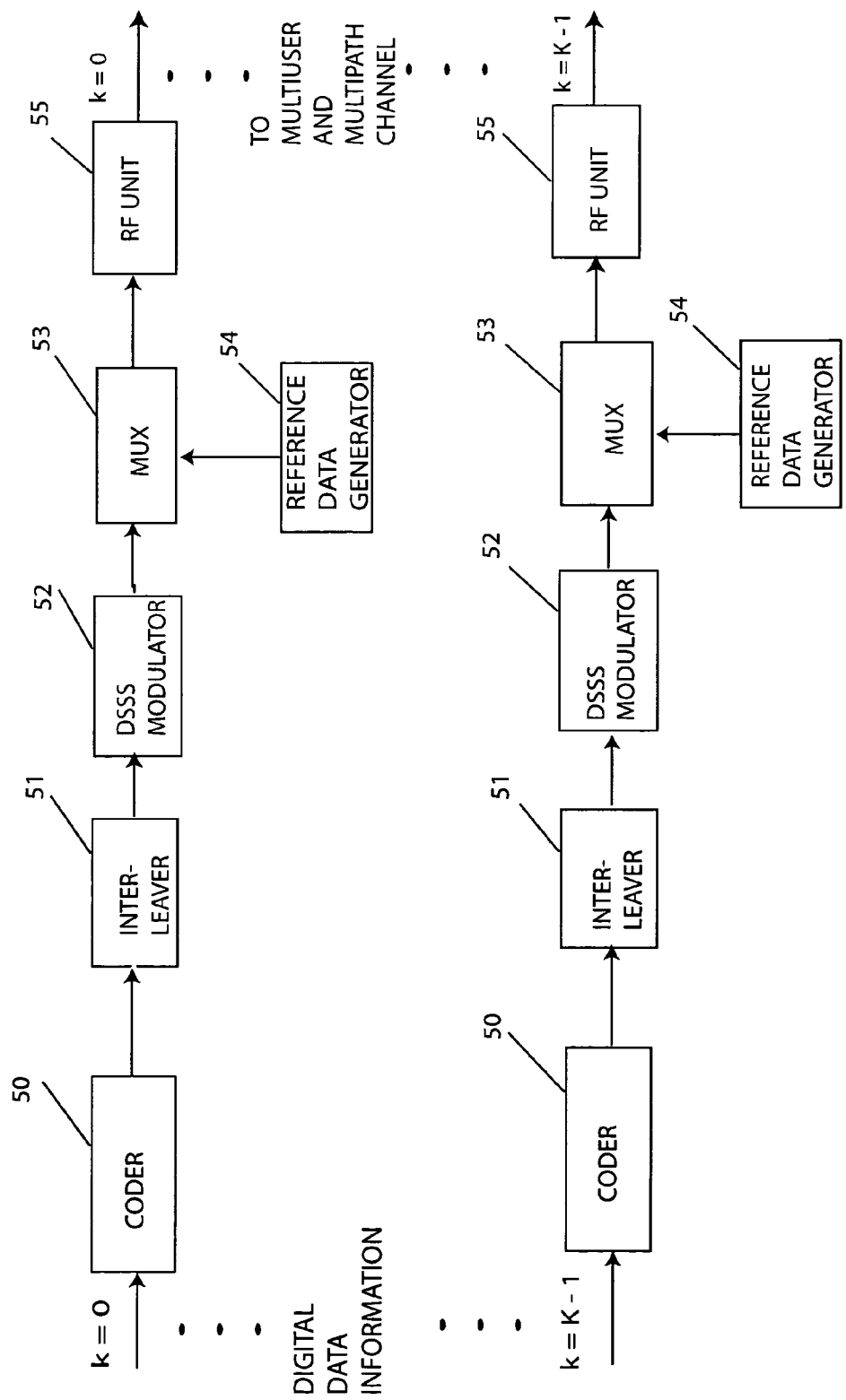
FIG. 5 is a block diagram of the transmitter in the system of FIG. 4.

In the K-user transmitter of FIG. 5, digital data information for each user is applied to a block, turbo or convolutional forward-error-correcting (FEC) coder 50. For example, FEC coder 50 may use the rate ½, constraint length 7, binary convolutional code with generator 133, 171. The coded symbols at the FEC coder output are then interleaved over multiple equalizer processing blocks by interleaver 51. Either a convolutional or a block interleaver, both of which are described in *Error-Correction Coding for Digital Communications*, G. C. Clark, Jr. and J. Bibb Cain, Plenium Press, New York, N.Y., June, 1981, may be used. The interleaving delay length is at least the length of two receiver time blocks so as to provide protection against variations in block equalization performance due to nonstationary channel changes.

The output of interleaver 51 is a sequence of data symbols. For example, with preferred signaling using Quadrature-Phase-Shift-Keying (QPSK), the data symbols are complex and can be represented by the set $(\pm 1 \pm j)/\sqrt{2}$. With QPSK signaling and a binary FEC code, two bits at the FEC coder 50 are used to form one QPSK data symbol for input to the interleaver 51. With preferred QPSK signaling, the interleaver 51 can also be realized as two binary interleavers. The Direct Sequence Spread Spectrum (DSSS) modulator 52 produces a DSSS modulated signal by multiplying the data symbol sequence by a Pseudo Noise (PN) sequence that is unique to the user. The PN sequence used for DSSS modulation multiplies each data symbol of length $N_u T$ to provide multiple DSSS chips per bit. For example, in a preferred embodiment with Quadrature-Phase-Shift-Keying (QPSK) data symbols, the DSSS chips are also selected from the QPSK set $(\pm 1 \pm j)/\sqrt{2}$. The QPSK data rate in this example is $2/N_uT$ bits/second. For a spreading factor of N, there are N DSSS chip symbols in the system period of T seconds, i.e., a DSSS symbol rate of N/T. Each DSSS chip symbol contains $I_c$ chips so that the modulated signal user has a DSSS chip rate of $N I_c/T$ chips/second. In the preferred embodiment the chip modulation is also QPSK so $I_c$ is two. In general other modulations such as Quadrature Amplitude Modulation and M=ary, M>2, Phase Shift Keying can be employed together or in combination as the data symbol and chip modulation in the invention.

In a reference-directed embodiment the DSSS modulated signals may be time division multiplexed by MUX 53 in FIG. 5 with reference data produced by reference data generator 54. Reference data can also be multiplexed in frequency or in code division as, for example, in a forward link system with pilot transmitting terminals. The reference data, however, is unique to a specific user in a reverse link application and unique to a central station in a forward link application such that the receiver can exploit this known reference data for purposes of multiuser/multipath channel estimation. In the reference-directed reverse-link embodiment, the reference data is produced by multiplying the same PN code used for DSSS modulation with reference data symbols of length $N_uT$. Typically the time division multiplex operation places one reference data burst near the center of the frame but other multiple burst distributions are possible as well. The receiver knows the burst distribution in the data frame, the PN codes and the reference data symbol values for a set of K users processed by the equalizer. At the receiver K may be all the users in a CDMA cell, a subset of all the cell users, or a cell subset plus some users from adjacent cells. The number of reference data symbols for satisfactory channel estimation in a K user system is on the order of K. In WCDMA with K about 100 the frame length must be much greater to keep the overhead loss small. For example with 100 reference data symbols and F=400 information data symbols, the overhead loss is about 1 dB. At a data rate of 32 kbps and QPSK modulation the data symbol period is 62.5 us and the frame duration for this example is 31.25 ms. Since many CDMA channels are not stationary for this length of time, a decision-directed embodiment uses decisions from a previous frame for channel estimation. Although decisions can be incorrect leading to adaptation errors this effect is offset by the shorter channel stationarity time requirement. In the decision-directed reverse-link or referenced-directed pilot transmitting application, reference data is not multiplexed in with the information data symbols and units 53 and 54 are omitted from FIG. 5.

The Radio frequency (RF) unit 55 converts the DSSS modulated signal to radio frequencies for transmission over the multiuser/multipath channel.

Figure 6:
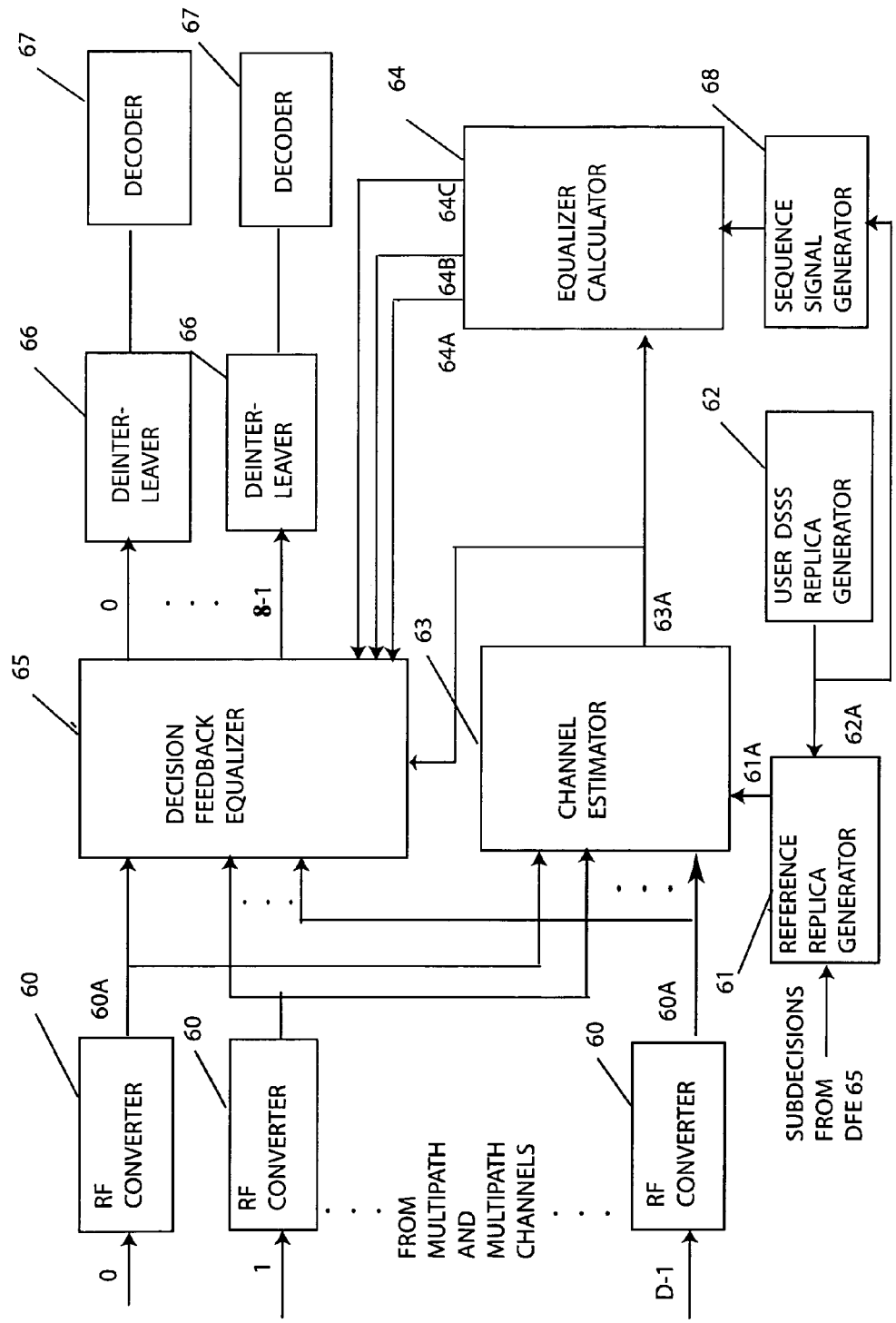
FIG. 6 is a block diagram of the receiver in the system of FIG. 4.

At the receiver in FIG. 6, RF converters 60 convert the received signals at the outputs of $D \geq 1$ diversity antennas to received diversity signals that have a digital data format so that subsequent processing is digital. These received diversity signals are also grouped into receiver time blocks for subsequent block processing.

The receiver in FIG. 6 contains a reference replica generator 61 for producing user reference data 61a. User DSSS replica generator 62 produces user DSSS signals 62a that correspond to each of the K transmitted users. In the decision-directed embodiment the reference data for each user corresponds to user previous decisions modulated with the user-unique DSSS signal. In the reference-directed embodiment the replica reproduces the user-unique transmitted reference data. The user DSSS signals 62a are also formatted in sequence signal generator 68 to produce sequence signals.

In general a multiple access user signal is distorted by contribution from additive noise, multipath fading, and interference from other users both within the same cell (intracell) and from adjacent cells (intercell). In the receiver a block decision-feedback equalizer processes one or more received diversity signals and reduces noise, multipath interference, and both intracell and intercell multiple access interference. The equalization is called block equalization because the equalizer parameters are derived from either reference data signal values embedded within a time block or decisions from a previous time block and the received signals are then processed using these equalizer parameters over the block duration.

The block equalizer requires three computational phases in each block. These phases are (1) channel estimation
(2) equalizer solution calculation
(3) signal equalization These three phases are realized as separate processors shown in FIG. 6 as respectively, channel estimator 63, equalizer calculator 64, and decision-feedback equalizer 65. Subsequent to the processing in these three phases, the equalizer outputs symbol estimates of the user digital data symbols associated with a subset λ less than or equal to the number K of mutual-interfering users. Decisions for each symbol epoch in the frame are produced in DFE 65 by combining $N_U$ subsymbol estimates to produce a symbol estimate. In a CDMA system where all the users operate at the maximum data rate so that $N_{U-}$ is unity for all users, the user symbol estimate is identical to the user subsymbol estimate. Subsequently the λ DFE symbol estimates are quantized to the closest transmitted data symbol value. These decisions are partitioned into successive subdecisions that are equal in value to the decision but have a duration equal to the system period. For a user with data rate reduced from the maximum user data rate by the integer multiple $N_u$, there are $N_u$ subdecisions per decision. The subdecisions are used in the backward filter of the DFE to cancel past ISI associated with the λ detected users. The DFE symbol estimates for each user are deinterleaved in deinterleaver 66 and error correction decoded in decoder 67. The recovered digital data information at the output of decoder 67 represents final decision values produced after the delay associated with deinterleaving and FEC decoding. These final decisions are not used in the backward filter of the DFE because of the time delay associated with the deinterleaver 66 and decoder 67.

An object of the invention is to perform each of the three computational phases in the equalizer using complex vector dot product arithmetic for which a special purpose dot product subprocessor can be optimized for speed and memory requirements. Accordingly the equations for these phases are presented in matrix form and the computational functions and complexity associated with each phase are identified. Complexity is measured by the complex multiply rate (CMR), i.e. the number of complex multiplies per second required in a signal processing operation.

Received Signal Definition

A mathematical description for received signals is provided for a set of K mutual-interfering users wherein each user employs a direct sequence spread spectrum (DSSS) signal with chip symbol duration $T_c$ and data symbol duration $N_u T$ where $N_u N = N_u T/T_c$ (integer) is the number of chip symbols in the DSSS waveform per data symbol. The DFE operates at the system rate 1/T producing subsymbol estimates and subdecisions. In a multiple data rate CDMA application the DFE requires combining of DFE subsymbol estimates to produce symbol estimates and decisions on these symbol estimates. More frequent updates of the DFE parameters are also required in the multiple data rate CDMA application. These features are noted where necessary in the following mathematical development. The received frame over which equalization of received signals takes place contains F data subsymbols. In the preferred embodiment the data and DSSS modulation use QPSK format so there are two chips per DSSS symbol and two bits per data subsymbol. The DSSS symbol rate is N/T and the system subsymbol rate is 1/T. The chip and bit rates are twice these values, respectively. The digital data information for the kth user is error-correction coded and interleaved to produce a set of data symbols that can be partitioned into data subsymbols $a_k(n)$, n=0, 1,2, . . . , F−1 in a transmit frame. The DSSS signals that modulate the data subsymbols are defined for subsymbol epochs n=0,1,2, . . . , F−1 and for a time duration of T seconds in each epoch. Let $s_k(n, t+nT)$ represent the DSSS signal for the kth user and the nth subsymbol during the transmission interval nT+t, $0 \leq t < T$, and by definition $s_k(n,t+nT)=0$ for t<0 and $t \geq T$. For the long PN code embodiment this signal is different for each integral n value. In the short PN code period embodiment for the largest user data rate the PN sequence is periodic with period T with the result $$s_k(n,t+nT)=s_k(0,t) 0 \leq t < T.$$

The data subsymbols are selected from the QPSK set $(\pm 1 \pm j)/\sqrt{2}$. The N chip symbols in the DSSS signal are also selected from the QPSK set. There are D, $D \geq 1$, diversity antennas and M, $M \geq 1$, transmittance paths with transmission values $h_{dk}(m)$ between the kth user and the dth diversity antenna. Synchronization is assumed to have already occurred in this formulation and for simplicity the transmission delay is normalized to zero seconds. In the interval t+nT+lT, $0 \leq t < T$ for estimation of the $n^{th}$ transmitted subsymbol, the synchronization assumption and zero transmission delay means that the l=0 (present) received subsymbol epoch contains the first significant received energy associated with the nth transmitted subsymbol of the least delayed user in the set of $\lambda$ users to be detected. The estimation of the nth subsymbol for each of the $\lambda$ users occurs in the nth subdecision interval defined to be the l=0 receiver subsymbol epoch t+nT, $0 \leq t < T$, n=0,1,2 . . . , F−1. In the (v, P) DFE, the DFE processes v (past, l<0) receiver subsymbol epochs prior to the subdecision interval, P (future, $l \geq 0$) receiver subsymbol epochs after the subdecision interval, and the subdecision interval. Thus with synchronization and a normalized delay of zero seconds, estimation of the nth subsymbol in the frame requires the DFE to process received subsymbol epochs t+nT+lT, $0 \leq t < T$, for l=−v, −v+1,...,0,1,... P. These received subsymbol epochs define the equalizer span for the nth subdecision interval.

Performance of the DFE is optimized when its parameters are modified near the beginning and the end of the frame. For example, at the beginning of the frame when n<v, the value of v can be reduced and at the end of the frame when n>F−1−P, the value of P can be reduced. Under typical conditions in CDMA, delay due to multipath and asynchronous effects is small compared to the data symbol duration so that v and P can be the same for all users. However, for example, if the asynchronous delay is not small compared to the data symbol length, different values of v and P for subsets of the users will produce better performance. For ease of presentation, the signal equations for the DFE are presented with different v and constant P values for two subsets of users and for an equalizer span that does not require v or P adjustments due to frame edge effects. The extension of the signal equations presented here is straightforward for this general case where v (k) and P(k) have been selected different for arbitrary subsets of users. Each subset results in vectors and matrices defined below with different dimensions depending on the parameters v(k) and P(k) for the subset. The equations presented here are for a two subset partition where P is constant and v=0 for $0 \leq k \leq \lambda-1$ and $v \leq 0$ for $\lambda \leq k \leq K-1$.

For each user k, diversity d, there is a set of M transmission paths corresponding to multipath with channel coefficient $h_{dk}(m)$ and multipath delay $\tau_{dk}(m)$, m=0,1,... M−1. Because of synchronization and the normalized transmission delay of zero seconds, for the delay values associated with the set of $\lambda$ users to be detected, one of the $\tau$ values is zero and the rest are positive. The $\tau_{dk}(m)$ values associated with the $\mu=K-\lambda$ users that are not detected may be either positive or negative because synchronization is not based on the nondetected user set. In this analysis the channel coefficients are assumed unknown and the delay values which generally change more slowly are assumed to be tracked by a separate algorithm not described here.

In the forward link, transmission of multiple user signals from a central station to a mobile user results in the same channel for all users. Thus at a user mobile receiver associated with the central station in the user cell and receiving interference from a second central station in an adjacent cell, there will be channel parameters $h_{d0}(m)$ and $\tau_{d0}(m)$, m=0,M−1, for a set of $K_1$ of users in the user cell and $h_{d1}(m)$ and $\tau_{d1}(m)$, m=0,M−1, for a set of $K_2$ interfering users in the adjacent cell. In the reverse link the channel parameters $h_{dk}(m)$ and $\tau_{dk}(m)$ are generally different for each user k.

For this problem formulation the received signal from the dth diversity antenna from the K mutually-interfering users can then be written in the system period interval $t \in (0,T]$ corresponding to the lth received subsymbol epoch as $$r_d(t+lT) = \sum_{n=0}^{F-1} \sum_{k=0}^{K-1} a_k(n) \sum_{m=0}^{M-1} h_{dk}(m) s_k(n, t+lT - \tau_{dk}(m)) + \quad (1)$$

$$u_d(t)$$

$$d = 0, 1, \ldots, D-1$$

$$l = -v \ldots 0, \ldots P$$

where $u_d(t)$ is the additive noise at diversity antenna d. The users are ordered in Eq. (1) so that the first $\lambda$ users are the ones to be detected in the (v,P) DFE receiver.

The received signal is sampled at a rate that is a multiple of the DSSS symbol rate. Let Q be an integer, typically two, so that the sampling rate is $Q/T_c$. Initial signal processing by the matched filter is realized in a matrix fractional-tap processor with tap spacing equal to $T_c/Q$. In this formulation, the multipath is decomposed so that the transmission delays can be taken as integer multiples of this fractional tap spacing, i.e., $\tau_{dk}(m)=i_{dk}(m)T_c/Q$ where $i_{dk}(m)$ is a positive integer.

Because of the assumed time limited nature of the DSSS signals and for multipath and asynchronous effects that introduce P symbols of intersymbol interference, the DFE received signal statistics in the Eq. (1) signal for $\lambda$ user detection at the nth subdecision interval are limited to the interval −vT$\leq$t−nT<T(P+1). This interval is denoted the matched filter (MF) span and is illustrated in FIG. 3. In this interval Eq.(1) can then be rewritten in sampled data form as $$r_d(iT/NQ + nT + lT) = \sum_{p=-P+v}^{l} \sum_{k=0}^{K-1} a_k(n+p) \sum_{m=0}^{M-1} h_{dk}(m) s_k \quad (2)$$

$$\left(n+p, \frac{i+nNQ+lNQ-i_{dk}(m)}{NQ/T}\right) +$$

$$u_d(iT/NQ + nT + lT)$$

$o \leq i \leq NQ - 1$ $o \leq d \leq D - 1$ $-v \leq l \leq P$

Receiving subsymbol epochs are defined by the negative delay index l. In the nth subdecision interval, the DFE uses future (l>0) receiving subsymbol epochs and the present receiving subsymbol epoch (l=0) in order to generate data subsymbol estimates of $a_k(n)$ for $0 \leq k \leq \lambda - 1$ for subsequent deinterleaving and decoding. When $K > \lambda$ so that not all users are detected, the DFE may also use past receiving subsymbol epochs (l<0) in the equalization processing.

Column vectors are defined in this presentation as follows. The received signal vector for the dth diversity, lth received signal epoch and nth subdecision interval is $$\underline{r}_d^{(n)}(l) = \{\rho_p, i=0,1,\ldots, NQ-1\} \quad (3)$$

corresponding to an NQ×1 vector ordered from i=0 down to i=NQ−1 with values $\rho_i = r_d(iT/NQ+nT+lT)$ The corresponding noise column vector is $$\underline{u}_d^{(n)}(l) = \{u_d(iT/NQ+nT+lT), i=0,1,\ldots, NQ-1\} \quad (4)$$

In the DFE analysis there are present and future data subsymbol values that are unknown. These are grouped into the P+1 set of Kth order column vectors (the subscript denotes the order of these column vectors)

$$\underline{a}_K^{(n)}(q) = \{a_k(n+q), k=0,1,\ldots, K-1\} \; 0 \leq q \leq P \quad (5a)$$

There are also past subsymbol values that are assumed known corresponding to previous decisions from the λ user detected set that are taken as correct in the DFE analysis. In a multiple data rate system for a user with data symbol rate $1/N_u T$ these decisions are detected from the sum of $N_u$ DFE subsymbol estimates. The past subsymbol values are then subsymbols of length T corresponding to components of user decisions of length $N_u T$. The known past subsymbol values are grouped into a (P+v) set of λ order column vectors.

$$\underline{a}_\lambda^{(n)}(q) = \{a_k(n+q), k=0,1,\ldots, \lambda-1\} - P - v \leq q < 0 \quad (5b)$$

Because the matched filter processes received signals that extend v epochs into the past and there are P epochs of intersymbol interference, these are v+P past subsymbols in the λ user set that produce interference that can be cancelled in the backward filter.

Additionally there are past subsymbol values that are unknown as they are produced by nondetected users numbered in the range $\lambda \leq k \leq K-1$. These past subsymbol values produce interference that is reduced by the forward filter. These subsymbols are grouped into the v set of $\mu = K - \lambda$ column vectors.

$$\underline{a}_\mu^{(n)}(q) = \{a_k(n+q), k=\lambda, \lambda+1, \ldots, K-1\} - v \leq q < 0 \quad (5c)$$

Finally there are past subsymbol values that are unknown and are not reduced by either the forward or backward filter. The values correspond to Eq. (5c) but for q values between −v−1 and −v−P. The unprocessed ISI results from finite length linear equalizers and can generally be made small when the length of the equalizer is adequately large. For purposes of deriving the equalizer equations this unprocessed ISI component is assumed to be included in the noise vector of Eq. (4).

With the introduction of the user subset of size λ and μ, it is convenient to define the delay-user widths of the forward and backward filters. The forward filter processes μ users in the time causal portion of the forward filter that has delay span v and it processes K users in the anticausal portion of the forward filter that has a delay span P+1, so the product width is $W_{FF} = \mu v + K(P+1)$ The backward filter processes λ users and their previous subdecisions over a delay span of v+P subsymbols for a product width of $W_{BF} = \lambda(v+P)$ Additionally the matched filter and the forward filter have a delay width that we denote as $L = v + P + 1$ In order to convert Eq. (2) into matrix representation, one needs to define sequence vectors and channel vectors.

Sequence vectors of length NQ for each of the K users, M multipath returns per diversity, P+1 received subsymbol epochs, and 2P+1 data subsymbol epochs are defined as:

$$s_d^{(n)}(l, p, k') = \quad (6)$$

$$\left\{ s_k(n+p, \frac{q+nNQ+lNQ-i_{dk}(m)}{NQ/T}, q=0, 1, \ldots NQ-1 \right\}$$

where k' is the compound index kM+m, m=0, 1, ... M−1; k=0,1, ... K−1.

Channel vectors of length M for each of K users and D diversities are $$\underline{h}_{dM}(k) = \{h_{dk}(m), m=0,1, \ldots M-1\} \quad (7)$$

It is convenient to define three block diagonal matrices containing the above channel vectors and with dimensions KM×K, Kλ+λ, and Kμ+μ corresponding to the data subsymbol column vectors in Eq. (5)

$$H_{dK} = \begin{bmatrix} \underline{h}_{dM}(0) & & & \\ & \underline{h}_{dM}(1) & & \\ & & \ddots & \\ & & & \underline{h}_{dM}(K-1) \end{bmatrix}, \quad (8)$$

$$H_{d\lambda} = \begin{bmatrix} \underline{h}_{dM}(0) & & & \\ & \underline{h}_{dM}(1) & & \\ & & \ddots & \\ & & & \underline{h}_{dM}(\lambda-1) \end{bmatrix}$$

-continued $$H_{d\mu} = \begin{bmatrix} \underline{h}d_M(\lambda) & & & \\ & \underline{h}_{dM}(\lambda+1) & & \\ & & \ddots & \\ & & & \underline{h}_{dM}(K-1) \end{bmatrix}$$

Similarly one defines three sequence matrices wherein each column of the matrix is an NQ sequence vector, Eq. (6), corresponding to user k and multipath return m. Thus there are sequence matrices with dimensions NQ×KM, NQ×λM, and NQ×μM that contain sequence signals associated with user PN sequence values where $$S_{dKM}^{(n)} = \{s_d^{(n)}(l, p, kM + m), \tag{9a}$$
$$k = 0, 1, \ldots K-1, m = 0, 1, \ldots, M-1\}$$

$$S_{d\lambda M}^{(n)} = \{s_d^{(n)}(l, p, kM + m), \tag{9b}$$
$$k = 0, 1, \ldots \lambda-1, m = 0, 1, \ldots, M-1\}$$

$$S_{d\mu M}^{(n)} = \{s_d^{(n)}(l, p, kM + m), \tag{9c}$$
$$k = \lambda, \lambda+1, \ldots K-1, m = 0, 1, \ldots, M-1\}$$

These sequence matrices represent the PN sequence values in the received signal during the subsymbol epoch n+l due to multipath effects for a transmitted PN sequence sent during the n+p subsymbol epoch.

For the short PN code period at the largest user data rate the sequence matrices do not depend on n and have the property $$S^{(n)}(l,p) = S^{(0)}(l-p,0) \tag{10a}$$

Because of time causality and the normalized transmission time of zero seconds these matrices also have the general property $$S^{(n)}(l,p) \equiv 0 \; p>l \tag{10b}$$

Using this causality property in Eq. (2), the resulting matrix equation is $$\underline{r}_d^{(n)}(l) = \sum_{q=0}^{l} S_{dKM}^{(n)}(l,q) H_{dK} \underline{a}_K^{(n)}(q) + \tag{11}$$
$$\sum_{q=-\nu-P}^{q\max} S_{d\lambda M}^{(n)}(l,q) H_{d\lambda} \underline{a}_\lambda^{(n)}(q) +$$
$$\sum_{q=-\nu}^{q\max} S_{d\mu M}^{(n)}(l,q) H_{d\mu} \underline{a}_\mu^{(n)}(q) + \underline{u}_d^{(n)}(l) - \nu \leq l \leq P$$

where qmax=min (−1,l).

To obtain a matrix equation that has components corresponding to subsequent forward filter and backward filter processing, one defines the NQL×1 received vector $$\underline{r}_d^{(n)} = \{\underline{r}_d^{(n)}(l), l=-\nu, \ldots 0, \ldots, P\}$$

the $W_{FF} \times 1$ unknown subsymbol vector $$\underline{a}^{(n)} = \{\underline{a}_\mu^{(n)}(q), q=-\nu, \ldots, -1; \underline{a}_K^{(n)}(q), q=0,1,\ldots,P\} \tag{12}$$

the $W_{BF} \times 1$ past subdecision vector $$\underline{\alpha}^{(n)} = \{a_\lambda^{(n)}(q), q=-\nu-P, \ldots, -1\}$$

and the NQL×1 noise vector $$\underline{u}_d^{(n)} = \{\underline{u}_d^{(n)}(q), q=-\nu, \ldots 0, \ldots P\}$$

so that one can write a single matrix equation for the received signal.

$$\underline{r}_d^{(n)} = G_d^{(n)} \underline{a}^{(n)} + F_d^{(n)} \underline{\alpha}^{(n)} + \underline{u}_d^{(n)} \tag{13}$$

The forward sequence/channel matrix $G_d^{(n)}$ has submatrices $G_d(l,q)$ defined for the matched and forward filter delay span $-\nu \leq l$, $q \leq P$ as $$G_d^{(n)}(l,q) = S_{d\mu M}^{(n)}(l,q) H_{d\mu} \quad -\nu \leq l \leq -1 \tag{14a}$$
$$-\nu \leq q \leq l$$
$$= S_{dKM}^{(n)}(l,q) H_{dK} \quad 0 \leq l \leq P$$
$$l-P \leq q \leq l$$
$$= 0 \quad \text{otherwise}$$

The backward sequence/channel matrix $F_d^{(n)}$ of dimension $NQL \times W_{BF}$ has submatrices $F_d^{(n)}(l,q)$ defined for $-\nu \leq l \leq P$ and $-p-\nu \leq q \leq -1$ as $$F_d^{(n)}(l,q) = S_{d\lambda M}^{(n)}(l,q) H_{d\lambda} \quad -\nu \leq l \leq P \tag{14b}$$
$$-\nu-P \leq q \leq q\max$$
$$= 0 \quad \text{otherwise}$$

The first term in Eq. (13) includes the subsymbols $a_k(n)$, $k=0,1,\ldots \lambda-1$ to be estimated by the DFE and multiple-access and intersymbol interference that must be minimized by the forward filter after matched filtering. The second term of Eq. (13) contains intersymbol interference associated with previous subdecisions in the λ user detection set, assumed correct, corresponding to $a_k(n+q)$, $-\nu-P \leq q \leq -1$ and $0 \leq k \leq \lambda 1$. Eq. (13) will be used subsequently to derive the optimum DFE parameter under a minimum-mean-square error criterion.

Additionally a representation of the received signal is required for the problem of optimum channel estimation. For channel estimation a set of reference values $a_k(j)$, $0 \leq j \leq J-1$, $0 \leq k \leq K-1$, are known at the receiver. For example, in the reverse link, this can be accomplished by transmitted time division multiplexed values within the frame or using receiver decisions from a previous frame. In the forward link, for example, these reference values may be sent on a separate CDMA carrier and subsequently reproduced at the receiver. These reference values are grouped into KM×KM diagonal matrix $$A_{KM}^{(j)} = \begin{bmatrix} a_{0j} I_m & & & \\ & a_{1j} I_m & & \\ & & \ddots & \\ & & & a_{K-1,j} I_m \end{bmatrix}$$

where $I_m$ is the identity matrix of order m.

The channel estimation problem consists of determining the channel gains $h_{dk}(m), d=0,1,\ldots, D-1, k=0,1,\ldots, K-1$, m=0,1, ..., M−1 associated with known multipath delay values $\tau_{dk}(m)$. The unknown channel gains can be grouped into a set of D channel vectors to be estimated $$\underline{h}_d = \{h_{dk}(m), k' = kM+m, m=0,1,\ldots,M-1, k=0,1,\ldots, K-1\} \quad (15)$$

In the reverse link K is the total number of interfering users. In the forward link, for purposes of channel estimation, K is equal to the number of cells in which the equalizer considers interference.

Eq. (2) can then be written in terms of the reference values and the unknown channel vector as $$r_d(j) = \sum_{p=j-P}^{j} S_{dKM}^{(0)}(j,p) A_{KM}^{(p)} \underline{h}_d + u_d(j) \quad 0 \le j \le J-1 \quad (16)$$

Complexity Considerations

Complexity of the equalizer is measured by a complex multiply rate (CMR) defined as the required number of complex multiplies in a system subsymbol time of T seconds. Some quantities only need to be calculated once per frame where we take the number of subsymbols to be estimated in the frame as a value F. Complex sign changes are accomplished with less complexity and division by an empirical implementation factor $I_F \gg 1$ is used to convert these computations into complex multiply equivalents. Complex comparisons arising from multiplication of PSK values, for example, $\exp(j\pi i/4)$ and $\exp(j\pi p/4)$, i,p both integer, are not counted because modulo arithmetic rather than complex multiplies can be used. In particular the computational load is determined for a reverse link/short PN code application with $\lambda = K$ configuration and a forward filter link/long PN code application with $\lambda \ll K$. The reverse link requires computation for multiuser detection of $\lambda = K$ users at a central station but the multiuser equalizer parameters need only be calculated once per frame because the PN code repeats every subsymbol. The forward link requires detection of a small number of users at a mobile receiver terminal but the equalizer parameters must be calculated for every subsymbol in the frame because the PN codes for the detected and interfering users change from subsymbol to subsymbol.

The complexity multiply rate (CMR) for these two applications are denoted CMR (R) and CMR (F) where R and F refer, respectively, to the reverse link and forward link configurations described above. The system parameters have been previously defined and typical values for a wideband CDMA application are given in the following table for reverse and forward link embodiments.

|  | Reverse Link | Forward Link |
| --- | --- | --- |
| Number of users, | K = 100 | K = 100 |
| Fractional tap integer, | Q = 2 | Q = 2 |
| Number of channels | 100 | 1 |
| Number of diversity paths, | D = 2 | D = 1 |
| Number of multipath returns, | M = 4 | M = 4 |
| Number of intersymbol interferers, | P = 1 | P = 1 |
| Modulation subsymbol time, | T = 1 E − 4 sec. | T = 1 E − 4 sec. |
| Number of users detected | $\lambda$ = 100 | $\lambda \ll$ K |

With equalization of the other users and under general conditions, the present invention can support K=N users, where N is the spread spectrum processing gain. Chip design simulations conclude that $I_F = \delta K$ where $\delta$ is on the order of $\frac{1}{8}$ to $\frac{1}{16}$. For purposes of numerical calculations, the number of subsymbols per frame F is assumed equal to K, the number of users. Additionally the number of reference subsymbols J required for channel estimation is also assumed to be equal to K. Where possible it is desirable to find complexity reduction that limits the CMR to a linear rather than a square factor of the number of users K so that the functions with linear dependence on K will be negligible in the overall calculation. Complexity that results in a cubic dependence on K is considered excessive for practical implementation.

For convenience the equations for CMR that are subsequently derived are summarized here in Table 1 for the reverse link embodiment and Table 2 for the forward link embodiment. Certain practical approximations mentioned above, that better allow a comparison based on the functional dependence on K the number of users, are Number of DSSS symbols per data subsymbol N=K
Number of data subsymbols per frame F≐K
Number of reference subsymbol values per frame J≐K

TABLE 1

Reverse Link Complexity, $\lambda = K$, $\gamma = 0$

| Function | Approx T * CMR | K Dependence |
| --- | --- | --- |
| KD Channel Estimations | $K^2DM^3/6$ | Square |
| K Matched Filters | $KDMQ(P+1)/\delta$ | Linear |
| K Forward Filters | $(P+1)K^2$ | Square |
| K Backward Filters | $KP^2/\delta$ | Linear |
| 1 FF Correlation | $KDM^2(P+1)(P+2)/2$ | Linear |
| K FF Solutions | $K^2(P+1)^3/6$ | Square |
| K BF Solutions | $KDM^2(P+1)^2P/2$ | Linear |

The calculation for a reverse link system are with all users detected, $\lambda = K$, $\gamma = 0$, and for all users operating at the system data rate 1/T, i.e., $N_u = 1$. Table 1 shows that the complexity is quadratically dependent on K for the KD channel estimations, processing of the K forward filters, and the calculation of the MMSE solutions for the parameter values of the forward filters. Since the backward filter provides only linear contributions, for large K there is no computational disadvantage for using a DFE to obtain better performance than would be realized with a linear equalizer. Conventional equalization strategies that attempt to adapt the equalizer directly have a linear dependence for the slowly converging LMS algorithm. The invention uses channel estimation for rapid convergence but with a square dependency on K. When multiple data rates are used in the system, the computation of the forward filter solutions increases by a factor of max $N_u$, corresponding to the number of system periods within one period of the lowest data rate user. The complexity is still quadratic in K since max $N_u$ is significantly less than K if significant spread spectrum gain is to be realized for the largest data rate users.

TABLE 2

Forward Link Complexity, $\lambda \ll K$, $\gamma = P$

| Function | Approx T * CMR | K Dependence |
| --- | --- | --- |
| $\lambda$ Channel Estimations | $\lambda DM(P+1)/\delta$ | Zero |
| K Matched Filters | $KDMQ(P+1)/\delta$ | Linear |
| $\lambda$ Forward Filters | $\lambda K(2P+1)$ | Linear |
| $\lambda$ Backward Filters | $2P^2\lambda/\delta$ | Zero |
| 1 Forward Filter Correlation | $K^2 M^2(p+2)(P+1)(2p+1)/2$ | Square |
| $\lambda$ Forward Filter Solutions | $2\lambda(2P+1)^2 K^2$ | Square |

TABLE 2-continued

Forward Link Complexity, λ << K, γ = P

| Function | Approx T * CMR | K Dependence |
|---|---|---|
| λ Backward Filter Solutions | λ KDM² P(2P + 1)² | Linear |

The forward link complexity in Table 2 has been computed for a small number of detected users λ<<K, μ≐K, and forward filter parameters γ=P. The λ users are assumed to be in separate cells so that λ channel estimations are required. The forward filter, in particular, the correlation calculations and solutions for the parameters, dominate the complexity because these computations must be done each data subsymbol for the long PN code period embodiment. The use of a power series expansion for the forward filter solutions rather than matrix inversion reduces the K dependence from cubic to square.

Channel Estimation

Channel estimator 63 in FIG. 6 processes the D received diversity signals from RF converters 60 provided on connections 60A and the reference replicas 61A in order to calculate a set of channel parameters for a receiver time block. The channel parameters are subsequently supplied via connection 63A to the equalizer calculator 64 and decision-feedback equalizer 65. In the reverse link the channel is defined by M transmittance paths $h_{dk}(m)$ in Eq. (2) for each user k and diversity antenna d combination. A reference sequence of length J for each user, say, $a_k(j)$, for j=0,1,2, . . . J−1, is provided on connection 61A for estimating purposes. For forward link operation all the channels within a cell are the same so that only a single reference replica is required for each cell. The reference in a forward link application is typically sent from a pilot transmitting terminal at the central station and consists of a CDMA signal with a station-unique PN code. The reference values sent by the pilot transmitting terminal are known at the receiver and are produced by reference replica generator 61. For the reverse link the channels are all different and reference data must be unique for each user. The reference values for the K interfering users can be obtained in a decision-directed calculation from a previous frame from DFE 65 or as stored values corresponding to a timed division multiplexed reference sent within a frame. In the reverse-link reference-directed embodiment, each user reference sequence has been modulated by the same user PN sequence as the user digital data. The receiver knows these PN sequences $s_k(p,t+pT)$ for each of the K users so they can be generated in the DSSS replica generator 62 and provided to the reference replica generator 61 on connection 62A. In this estimation procedure, the path delay indices $i_{dk}(m)$ are assumed known. These indices generally remain constant for many frames and are tracked by a separate synchronization algorithm not described here.

Over the time interval corresponding to the known reference signal, the received signal at the dth diversity antenna can be rewritten in the form of Eq. (16) for the reference interval 0≤j≤J−1. In the reverse-link decision-directed embodiment J is less than or equal to F the number of subsymbols in the receiver frame and Eq. (16) represents the received signal in the previous receiver frame. The digital data values $a_k(j)$, j=0,1, . . . , J−1, k=0,1, . . . , K−1, represent subdecisions from the previous receiver frame. The channel parameters produced by using the received signal and subdecisions from the previous receiver frame are then subsequently used in the present receiver frame to obtain the next set of DFE estimates. For channel estimation of K channels in the reverse link, a complete set of K-user reference data is required in order to avoid adding data noise due to unknown symbols. Thus only the portions of a frame that overlap over the K-user set can be used in the decision-directed channel estimation. Because of asynchronous effects this generally results in J<F. A similar constraint arises in the reference-directed embodiment. The number of reference subsymbols, J, is equal to the number of data subsymbols in the span designated Channel Estimation Interval of FIG. 2 that includes all K user midambles in the received signal for the receiver frame where estimates next need to be produced. For reference-directed channel estimation and asynchronous transmission this span will generally be less than the midamble duration. In both embodiments the digital data components of the matrices $A_P$ in Eq. (16) are all reference values.

Since the noise vectors in Eq. (16) in each of the J subsymbol epochs during the reference interval are statistically independent, the maximum likelihood estimate of the channel vector hd can be found as follows. The reference replica is represented as sequence/source matrices derived from the reference replica generator 61.

$$\Im_d(j,p) = S_{dKM}^{(0)}(j,p) A_{KM}^{(p)} \quad 0 \leq j \leq J-1, j-P \leq p \leq j$$

These matrices are computed without complex multiplications and each entry is a complex sign of the form $(\pm 1 \pm j)/\sqrt{2}$. In reference correlator 70 in the channel estimator of FIG. 7 the sequence/source matrices and received diversity vectors are correlated to obtain the coarse estimate.

$$\tilde{h}_d = \sum_{j=0}^{J-1} \sum_{p=j-P}^{j} \Im'_d(j,p) r_d(j) \quad (17)$$

The maximum likelihood estimate requires the inversion of the matrix $$\Im = \sum_{j=0}^{J-1} \sum_{q=j-P}^{j} \sum_{p=j-P}^{j} \Im'_d(j,q) \Im_d(j,p) \quad (18)$$

Calculation of this matrix is also achieved without complex multiplications. The calculation to obtain the fine estimate gives the channel estimation vector.

$$\hat{h}_d = \Im^{-1} \tilde{h}_d. \quad (19)$$

Because the matrix $\Im$ has small off-diagonal elements, the coarse estimate Eq. (17) can be used when processing time does not allow for inversion of $\Im$, and fine adjustment of Eq. (19). For application where the number of users K is close or equal to he number of chip symbols N, these off-diagonal elements become important and significant performance degradation results when the fine adjustment step is omitted.

Figure 7:
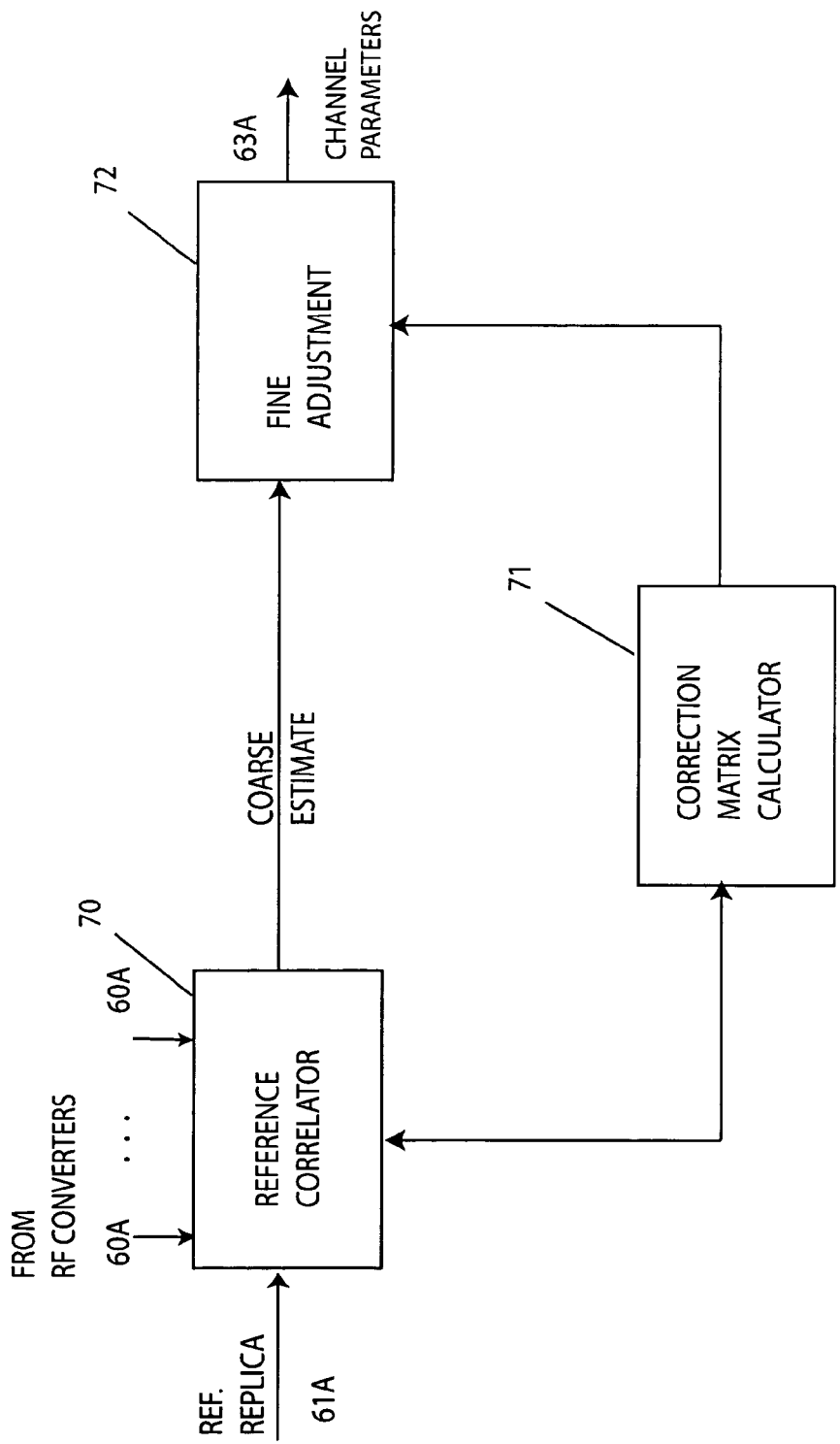
FIG. 7 is a block diagram of the channel estimator in the receiver of FIG. 6.

The matrix $\Im^{-1}$ is a correction matrix that is calculated in the correction matrix calculator 71 of FIG. 7. Methods of inverting matrices using Cholesky decomposition and further reducing complexity by exploiting sparse characteristics of the matrix to be inverted will be discussed subsequently. In the reverse link embodiment the matrix $\Im$ may not need to be inverted every frame because user signatures and path delay indices can remain constant for many frames. The complexity for matrix inversion once per frame with Cholesky decomposition is $(KM)^3/6FT$ and with F approximately equal to K the CMR for the matrix inversion is quadratic in K and D inversions are required.

Eq. (18) is realized in the fine adjustment 72 multiplication in FIG. 7 with output 63A consisting of the channel parameters of Eq. (19).

The channel estimation step to obtain the coarse estimate Eq. (17) at the output of the reference correlator 70 first requires the calculation of the matrices $\Im_d(j,p)$. These matrices are formed from complex comparisons that involve no complex multiplies. The coarse estimate of Eq. (17) requires only complex sign changes with resulting complexity $$CMR(R) = KDMJNQ(P+1)/I_F FT \doteq KDMQ(P+1)/\delta T$$

which is approximately linear in K because the number of reference symbols J is on the order of K, N=K, F=K, and $I_F = \delta K$. The matrix inversion complexity then dominates the channel estimation complexity for the reverse link embodiment. The result for large K is $$CMR(R)_{CE} \doteq K^2 DM^3/6T$$

For the forward link in a multiple cell application with c cells only, cDM channel estimates are required. The matrix inversion is for a rank cM matrix and its complexity can be neglected when the number c−1 of adjacent cells is small. The complexity of the coarse estimate of the channel is also small as it does not depend on K.

$$CMR(F)_{CE} = DMQ(P+1)/\delta T$$

DFE Solution

Figure 8:
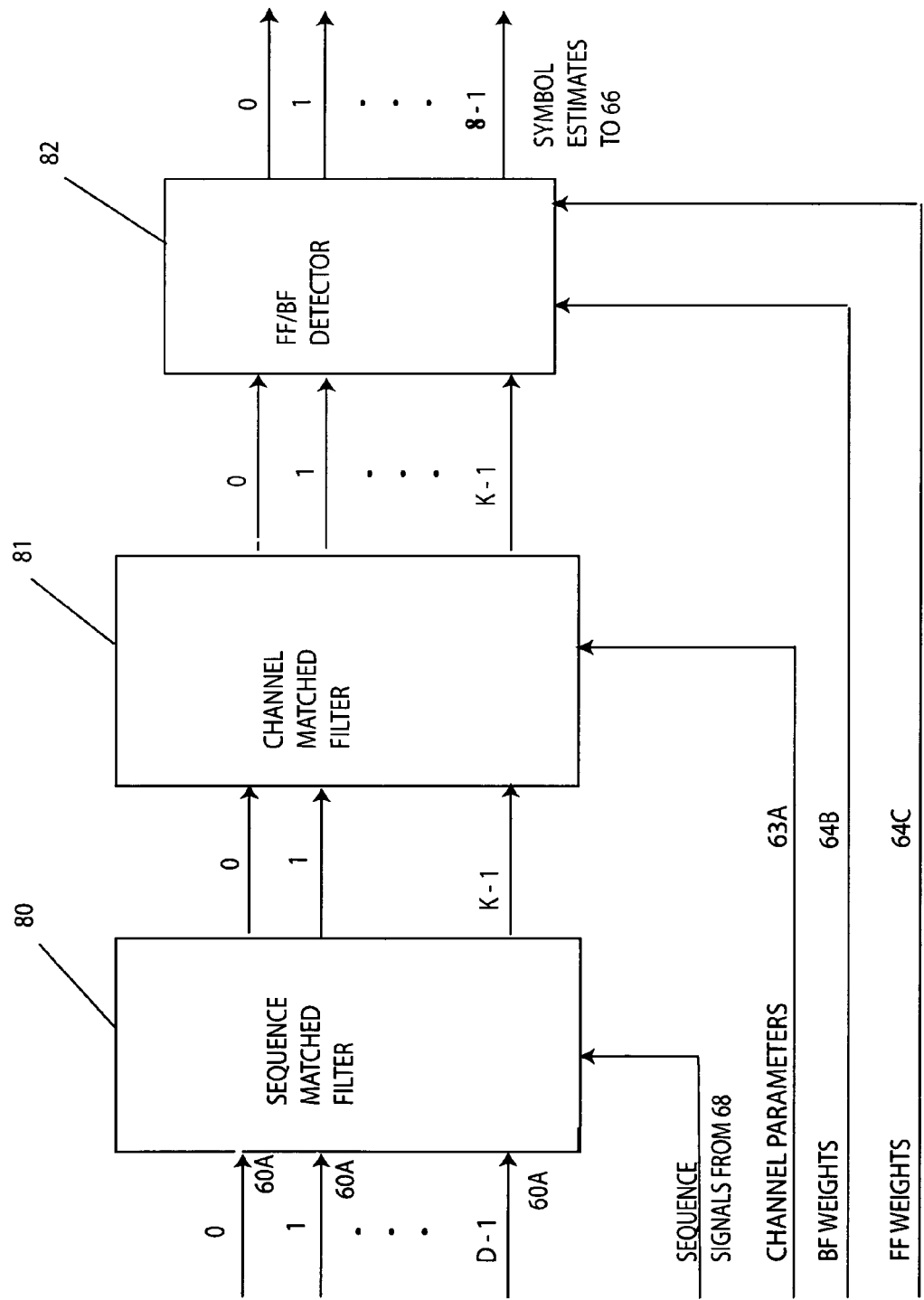
FIG. 8 is a block diagram of the decision-feedback equalizer in the receiver of FIG. 6.

The equalizer calculator 64 in FIG. 6 determines the parameters of a DFE that is the minimum mean square error (MMSE) equalizer under known channel conditions. This solution is then realized with the estimated channel parameters determined in channel estimator 63, FIG. 6. The MMSE DFE is well known, see for example MMSE Equalization, to be composed of a matched filter for signal combining, a forward filter (FF) and backward filter (BF) for interference reduction, and a quantizer for making decisions to be used in the backward filter. In this CDMA application a matched filter is decomposed into a sequence matched filter 80 and channel matched filter 81 as shown in FIG. 8. The forward and backward filters are calculated for a DFE solution with a subset of detected users and a subset of interference users. These filters are realized in a FF/BF detector 82 following the channel matched filter 81. The parameters for these DFE subsystems are determined here by solving a MMSE optimization problem based on the received vector Eq. (13).

One defines the compound vectors and matrices by combining diversity components as follows:

Received signal vector:

$$\underline{r} = \{\underline{r}_d^{(n)}, d=0,1,\ldots,D-1\}$$

Noise vector:

$$\underline{u} = \{\underline{u}_d^{(n)}, d=0,1,\ldots,D-1\}$$

Forward Sequence/Channel DLNQ×(νμ+(P+1)K) Matrix G containing submatrices defined in Eq. (14a):

$$G = \{G_d^{(n)}, d=0,1,\ldots,D-1\} \quad (20a)$$

Backward Sequence/Channel DLNQ×λ(ν+P) Matrix F containing submatrices defined in Eq. (14b):

$$F = \{F_d^{(n)}, d=0,1,\ldots,D-1\}_{10} \quad (20b)$$

The sufficient statistics can then be expressed in the compound form for the DFE as $$\underline{r} = G\underline{a} + F\underline{\alpha} + \underline{u} \quad (21)$$

Define the $W_{FF} \times 1$ delta vector corresponding to the kth desired user based on the definition of $\underline{a}^{(n)}$ in Eq. (12).

$$\underline{e}_k = \{\underline{e}_\mu(q), q=-\upsilon,\ldots,-1; \underline{e}_k(q), q=0,1,\ldots P\} \quad (22)$$

where $$\underline{e}_\mu(q) = 0 \quad q=-\upsilon,\ldots,-1$$

$$\underline{e}_K(q) = 0 \quad q=1,2,\ldots,P$$

$$\underline{e}_K(0) = \{e_{Ki}(0), e_{Ki}(0) = \delta_{ki}\}$$

The matrix optimization problem is to find the MMSE DFE for detection of the kth user in the detected user subset, k=0, 1, ... λ−1.

For the DFE, the vector $\underline{\alpha}$ is known and the matrices G and F have been calculated. The subsymbol sequences a and a are independent, zero mean, and are component uncorrelated such that $$E(\underline{a}\underline{a}') = I$$

$$E(\underline{\alpha}\underline{\alpha}') = I$$

The additive noise I is considered a zero-mean white noise process with second order statistics $$E(\underline{u}\underline{u}') = \sigma^2 I$$

where E(·) denotes the expected value, "'" denotes the complex conjugate transpose, and the value $\sigma^2$ is an estimate of the additive noise power plus unequalized ISI due to the finite range of the forward filter.

The minimum mean-square-error (MMSE) problem is to find the λ forward vectors $\underline{w}_k$ and the K backward vectors $\underline{v}_k$, so as to minimize each of the λ mean square errors:

$$\varepsilon_k = E|\underline{w}_k' \underline{r} - \underline{v}_r' \underline{\alpha} - \underline{e}_k' \underline{a}|^2, k=0,1,\ldots,\lambda-1 \quad (23)$$

Clearly the optimum solution for the backward filter in the DFE is to cancel all previous subdecisions. Thus $$\underline{v}_k = F' \underline{w}_k \, k=0,1,2,\ldots,\lambda-1 \quad (24)$$

The second moments are $$E(\underline{r}-F\underline{\alpha})(\underline{r}-F\underline{\alpha})' = GG' + \sigma^2 I$$

$$E(\underline{r}-F\underline{\alpha})(\underline{a}'\underline{e}_k) = G\underline{e}_k$$

so the MMSE solution for $\underline{w}_k$ must satisfy $$(GG' + \sigma^2 I)\underline{w}_k = G\underline{e}_k$$

The solution is $$\underline{w}_k = G\underline{f}_k \, k=0,1,2,\ldots,\lambda-1 \quad (25)$$

where G represents the matched filter part of the solution and the forward filter is $$\underline{f}_k = R^{-1} \underline{e}_k \, k=0,1,2,\ldots,\lambda-1 \quad (26a)$$

where $$R = G'G + \sigma^2 I \quad (26b)$$

In the absence of diversity and multipath, the matrix G'G cannot have rank greater than N, the spread spectrum processing gain. Interference cannot then be successfully reduced if the number of users K>N for a no diversity, no multipath system. The use of diversity antennas at the receiver and the presence of multipath can result in successful interference reduction when K>N. Also note that the matched filter portion of the joint detection solution is the same for all λ users. The steps to be performed in the matrix DFE are:

Matched filter combining (FIG. 8, matched filters 80 and 81) to produce channel matched signals:

$$\underline{x} = G'\underline{r} \ W_{FF} \times 1 \text{ vector} \tag{27a}$$

Backward filter cancellation (FIG. 8: Included in FF/BF detector 82) to produce equalization signals:

$$\underline{y} = \underline{x} - G'F\underline{\alpha} \tag{27b}$$

Forward filter equalization (FIG. 8: Included in FF/BF detector 82) to produce successive multiuser subsymbol estimates in the receiver frame:

$$\tilde{a}_k^{(n)}(0) = \underline{f}_k'\underline{y} \ k=0,1,2,\ldots,\lambda-1, n=0,1,2,\ldots F-1 \tag{27c}$$

The signal processing steps defined in Eq. (27) performed in the subsystems of FIG. 8, require that the DFE parameters consisting of backward filter weights 64B and forward filter weights 64C be calculated in the equalizer calculator 64 of FIG. 6. In FIG. 8 the sequence matched filter 80 requires sequence signals 64A that are included in the matrix G of Eq. (27a) and are generated by the sequence signal generator 68 of FIG. 6. The backward filter calculator 91 of FIG. 9 requires the channel parameters 63A from the channel estimator 63 of FIG. 6 and sequence signals 64A that are passed from the sequence signal generator 68 through the equalizer calculator 64 also shown in FIG. 6 in order to compute the components of G'F in Eq. (27b). For the forward filter equalization Eq. (27c), the solution Eq. (26a) starts first with a channel correlation calculation of G'G in the forward filter correlator 92. The noise power estimate σ² can be measured during weak or no signal conditions as it changes very slowly or can be fixed for a worst case value. In the short PN code embodiment the correlation matrix R in Eq. (26b) is inverted in the correlation matrix inversion 93 block. The forward filter weights are contained in the vector that is the corresponding column of this inverse matrix in accordance with Eq. (26a). The forward filter vectors 64C are generated in the forward filter vector generator 94 of FIG. 9. In the long PN code embodiment the output of the forward filter correlator 92 is provided to a delta matrix calculator 95 and subsequently a vector iteration calculator 96 is used for a power series expansion to obtain the forward filter vector.

Figure 10:
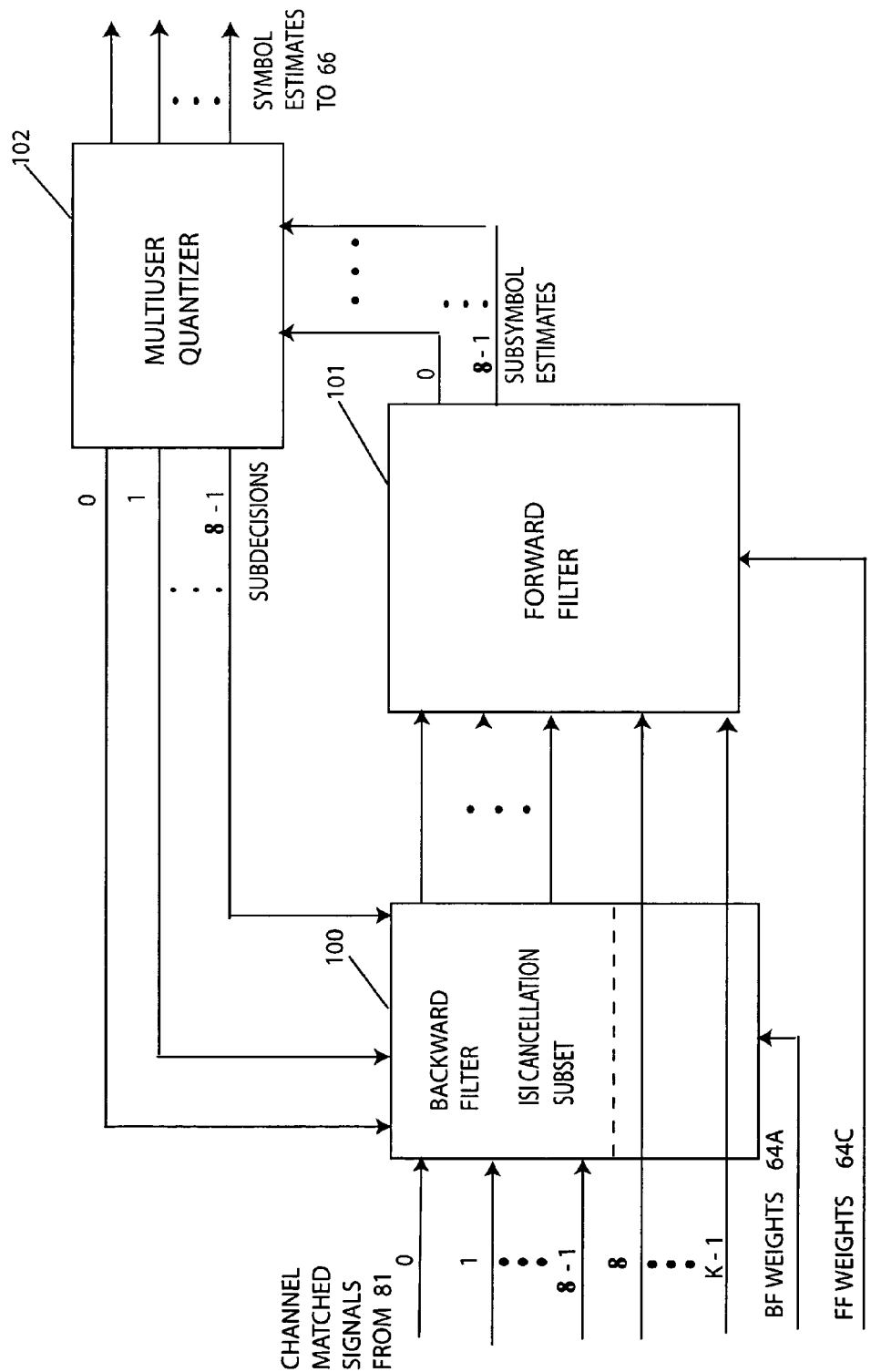
FIG. 10 is a block diagram of the FF/BF detector in the decision-feedback equalizer of FIG. 8.

In the signal processing steps of Eq. (27) the matched filter matrix multiplication G is partitioned into a sequence matched filter 80 and a channel matched filter 81 in FIG. 8. The sequence matched filter 80 combines received diversity signals and the sequence signals 64A to produce sequence matched signals. The channel matched filter 81 combines the sequence matched signals and channel parameters to produce channel matched signals that are defined in Eq. (27a). The channel matched signals are inputs to the forward filter/backward filter (FF/BF) detector 82. The FF/BF detector 82 processes the channel matched signals at the system data rate 1/T to produce subsymbol estimates. In a multiple data rate application the FF/BF detector 82 also produces estimates of user digital data symbols at the user data rate $1/N_uT$. The FF/BF detector 82 is shown in FIG. 10 to contain the backward filter 100, forward filter 101, and a multiuser quantizer 102. The backward filter 100 in FIG. 10 cancels previous subdecisions in the channel matched signals for the detected user subset. The remaining channel matched signals $k=\lambda,\ldots,K-1$ are not modified. The output of the backward filter 100 are the equalization signals of Eq. (27b). The forward filter 101 performs a dot product Eq. (27c) of these equalization signals with a vector of forward filter parameters in order to reduce multiple-access interference and residual ISI. The output of the forward filter contains successive λ subsymbol estimates. In a multiple data rate application the multiuser quantizer 102 in the DFE combines $N_u$ subsymbol estimates to produce a user digital data symbol estimate. Successive symbol estimates are also quantized into successive decisions in multiuser quantizer 102. A decision is quantized from the symbol estimate to a value that is closest to a transmitted digital data value. The multiuser quantizer 102 also partitions these decisions into subdecisions corresponding to subsymbol estimates. These subdecisions are outputs of the multiuser quantizer 102 that are sent to backward filter 100 to cancel past ISI resulting from associated subsymbols. The estimates of user digital data symbols at the output of the multiuser quantizer 102 are used as soft decisions in the deinterleaver 66 and error correction decoder 67 of FIG. 6 to recover the user digital data information. The subdecisions produced in the multiuser quantizer 102 of DFE 65 are also provided as shown in FIG. 6 to the reference replica generator 61 for producing reference replicas used in decision-directed channel estimation described in the section on channel estimation.

These equalization steps and the parameter calculations are computationally large for K large. The complexity in the equalization steps can be reduced by (1) decomposing the matched filter operation into a sequence matched filter 80 and a channel matched filter 81, (2) exploiting the complex sign structure in the signal characteristics in the sequence matched filter 80 component, (3) canceling past interference in the backward filter 100 after the matched filters 80,81 and before the forward filter 101, (4) exploiting sparse matrix characteristics, and (5) utilizing a power series expansion for matrix inversion.

Matched Filter

The matched filter combining step Eq.(27a) produces a matched filter composite $W_{FF} \times 1$ vector that can be decomposed into channel matched filter subvectors of order μ for negative delay index l<0 and order K for negative delay index l≧0 such that for the nth subsymbol interval $$\underline{x} = \begin{bmatrix} x_\mu^{(n)}(-\upsilon) \\ \vdots \\ x_\mu^{(n)}(-1) \\ x_K^{(n)}(0) \\ x_K^{(n)}(1) \\ \vdots \\ x_K^{(n)}(P) \end{bmatrix}$$

The matched filter calculation of Eq. (27a) expands to the results $$x_\mu^{(n)}(l) = \sum_{d=0}^{D-1} H'_{d\mu} \sum_{q=l}^{l+P} S_{d\mu M}^{(n)\prime}(q,l) r_d^{(n)}(q), \ -\upsilon \leq l \leq -1 \tag{28a}$$

$$x_K^{(n)}(l) = \sum_{d=0}^{D-1} H'_{dK} \sum_{q=l}^{P} S_{dKM}^{(n)\prime}(q,l) r_d^{(n)}(q), \ 0 \leq l \leq P \tag{28b}$$

The inner sum represents the outputs of the sequence matched filter 80 in FIG. 8 where for each diversity the sequence matched signals are:

$$\underline{\xi}_{d\mu}^{(n)}(l) = \sum_{q=l}^{l+P} S_{d\mu M}^{(n)\prime}(q,l) r_d^{(n)}(q), \quad -\upsilon \leq l \leq -1 \tag{29a}$$

$$\underline{\xi}_{dK}^{(n)}(l) = \sum_{q=l}^{l+P} S_{dKM}^{(n)\prime}(q,l) r_d^{(n)}(q), \quad 0 \leq l \leq P \tag{29b}$$

These sequence matched signals further contain sequence matched column subvectors $\underline{\xi}_{dk}^{(n)}$ of order M, i.e., $$\underline{\xi}_{d\mu}^{(n)}(l) = \{\underline{\xi}_{dM}^{(n)}(k,l), k=\lambda,\lambda-1,\ldots,K-1\} \quad -\upsilon \leq l \leq -1$$

$$\underline{\xi}_{dK}^{(n)}(l) = \{\underline{\xi}_{dM}^{(n)}(k,l), k=0,1,\ldots,K-1\} \quad 0 \leq l \leq P$$

The sequence signals corresponding to the $S_d$ matrices in Eqs.(28-29) above are defined in Eq.(9a) and (9c) as column vectors. These sequence signals are formatted as column vectors from the DSSS replicas in sequence signal generator 68 in FIG. 6 and subsequently provided to the equalizer calculator and then on line 64A to the sequence matched filter 80 in FIG. 8 for the calculation of Eq. (29).

The channel matrix $H_d$ of Eq. (8) that is used in Eq. (28) has a vector diagonal characteristic with M×1 subvectors $\underline{h}_{dm}(k)$ so that channel matched filter subvectors $\underline{x}(l)$ are the sum of diversity matched filter subvectors $$x_{d\mu}^{(n)}(l) = \{h'_{dm}(k)\underline{\xi}_{dM}^{(n)}(k,l), k=\lambda,\lambda+1,\ldots,K-1\} \tag{30a}$$

$$-\upsilon \leq l \leq -1$$

$$x_{dK}^{(n)}(l) = \{h'_{dm}(k)\underline{\xi}_{dM}^{(n)}(k,l), k=0,1,\ldots,K-1\} \tag{30b}$$

$$0 \leq l \leq P.$$

The channel matched filter 81 in the DFE of FIG. 8 performs Eq. (30) for each diversity and computes the channel matched signals $$\underline{x}_y^{(n)}(l) = \sum_{d=0}^{D-1} x_{dy}^{(n)}(l), \quad y=\mu,K. \tag{31}$$

The sequence matched filter outputs, Eq. (29), can be updated in each subsymbol epoch n from the values determined in the n−1 epoch. The iteration for the anticausal components is given by $$\underline{\xi}_{dK}^{(n)}(l) = \underline{\xi}_{dK}^{(n-1)}(l+1) + S_{dKM}^{(n)}(P,l) r_d^{(n)}(P+n) \quad 0 \leq l < P \tag{32a}$$

$$= S_{dKM}^{(n)\prime}(P,P) r_d(P+n) \quad l=P$$

From the K order vectors calculated above, in order to determine the causal sequence matched filter outputs one defines the $\mu$ order vectors $$\underline{\xi}_\mu^{(n)}(l) = \{\xi_{Ki}^{(n)}(l), i=\lambda,\lambda+1,\ldots,K-1\} \quad 0 \leq l \leq P \tag{32b}$$

and the causal components are computed from the sum $$\underline{\xi}_\mu^{(n)}(l) = \underline{\xi}_\mu^{(n-1)}(l+1) - \upsilon \leq l \leq -1 \tag{32c}$$

In terms of complex multiplications required, note that only the P+n received vector component needs to be computed in each new subsymbol epoch n. Because complex sign changes, instead of complex multiplies, are required, the computation rate is (P+1)MKDNQ/$I_F$T for the sequence matched filter and (P+1)MKD/T for the channel matched filter. Since NQ>$I_F$=δK and with N=K in our numerical example, the computation rate is dominated by the sequence matched filter calculation and it is the same for both the reverse and forward link embodiments.

$$CMR_{MF} = (P+1)MKDQ/\delta T \tag{33}$$

The complexity of the matched filter is linear in the number of users K in the present invention with decomposing of the matched filter. The direct computation of Eq. (27a) without the decomposing into sequence and channel matched filters is quadratic in K because it does not exploit the complex sign structure of the sequence signals.

Forward Filter Equalization

The forward filter 101 in FIG. 10 in the FF/BF detector 82 in FIG. 8 computes λ dot products for successive F subsymbol epochs according to Eq. (27c). The equalization signals in the vector $\underline{y}$ are produced by the backward filter 100. These equalization signals depend on the subdecision interval n and subsymbol delay offsets l=−v, . . . , P and are described subsequently in Eq.(43) in the section on backward filter cancellation. The forward filter dot products are of order equal to the delay-user width $W_{FF}$ so the computation rate for the dot product operations is.

$$CMR_{FF} = \lambda W_{FF}/T \tag{34}$$

This computation rate is quadratic in K for a reverse link embodiment with λ=K and is linear in K for a forward link embodiment with λ<<K.

Solution for the forward filter 101 given by Eq. (26) requires the computation of the channel correlation matrix R which contains the D order sum $$G'G = \sum_{d=0}^{D-1} G'_d G_d \tag{35}$$

Eq. (35) is computed in the forward filter correlator 92 of FIG. 9. In what follows a method to reduce the complexity of this computation is described. The diversity channel correlation matrix $C_d^{(n)} = G_d^{(n)\prime} G_d^{(n)}$ is hermitian so we only need to calculate the lower diagonal submatrices $C_d^{(n)}(p,q,)$, υ≦q≦p≦P. The matrix $G_d$ is lower diagonal and the p,q submatrices are defined in Eq. (20a). An iteration for the diversity channel correlation matrix requires the rank KM sequence correlation matrices $$\Phi_{dKM}^{(n)}(l,q) = S_{dKM}^{(n)\prime}(P,l) S_{dKM}^{(n)}(P,q) \quad 0 \leq q \leq l \leq P \tag{36}$$

that contain no complex multiplies and thus do not contribute to the CMR. For a short PN code with period T these matrices are independent of the subsymbol time n.

$$\Phi_{dKM}^{(n+P)}(l, q) = S_{dKM}^{(0)\prime}(P-l, 0) S_{dKM}^{(0)}(P-q, 0) \tag{37}$$

In general the iteration takes the form $$C_d^{(n)}(P, q) = H'_{dK} \Phi_{dKM}^{(n+P)}(P, q) H_{dK} \quad 0 \leq q \leq P \tag{38}$$

$$C_d^{(n)}(l, q) = C_d^{(n-1)}(l+1, q+1) + H'_{dK} \Phi_{dKM}^{(n+P)}(l, q) H_{dK}$$

$$0 \leq q \leq l < P$$

$$C_d^{(n)}(l, q) = C_d^{(n-q)}(l-q, 0) \quad -\upsilon \leq q \leq -1, q \leq l \leq q + P$$

For each received subsymbol epoch $(P+1)^2$ new K rank matrices of the form H'ΦH are calculated. The Φ matrix in this calculation is composed of $K^2$ submatrices $\phi_{ij}$, $0 \leq i, j \leq K-1$ of rank M. Because of the vector diagonal nature of H (see Eq. (8)), the $K^2$ elements of H'ΦH for each diversity are $$(H'\Phi H)_{kl} = \underline{h}_{dm}^{(k)\prime} \Phi_k \underline{h}_{dm}^{(l)}$$

Figure 9:
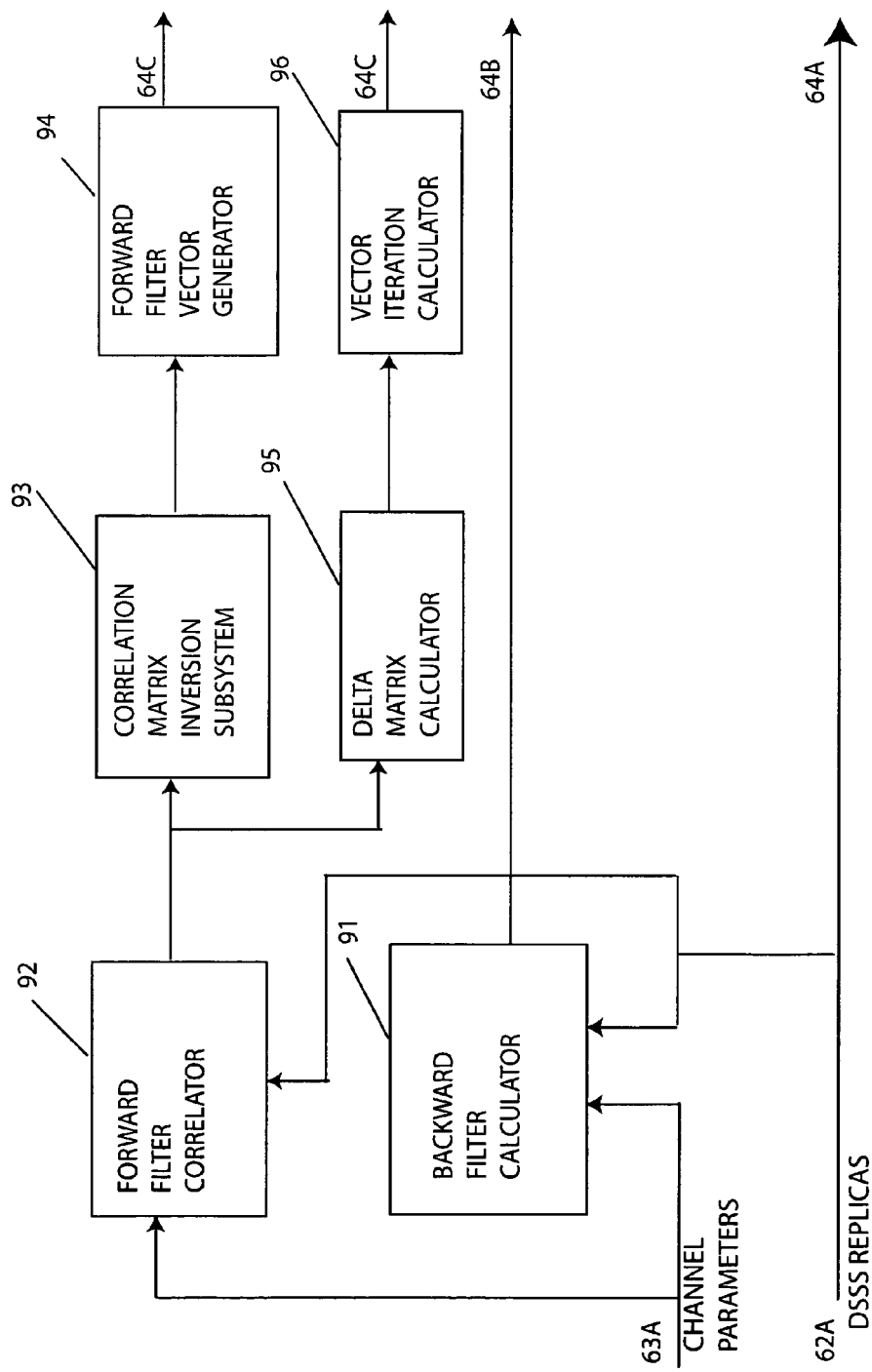
FIG. 9 is a block diagram of the equalizer calculator in the receiver of FIG. 6.

This quadratic form requires $M^2$ multiplies for $K^2$ subblocks to compute a product matrix $G_d'G_d$ in the forward filter correlator 92 of FIG. 9. For the reverse link embodiment with λ=K, ignoring additions in the computational load, there is only one iteration and $(P+2)(P+1)/2$ product matrices for each of the D diversities must be calculated. With storage of the received signals and a one frame time delay, the G'G calculation can be done over F subsymbols in the frame resulting in a computation rate of $$CMR_{G'G}(R) = \frac{1}{2} D(P+2)(P+1) M^2 K^2 / FT \tag{39}$$

The above equation is for all user data rates equal to the system data rate, $N_U$=1. The impact of multiple data rates is a requirement for more frequent updates of the equalization parameters. If max $N_u$ denotes the largest integer multiplier of the system period, then within one data frame the equalizer must be updated max $N_u$ times instead of once for this short PN period embodiment. This result occurs because the PN code period is equal to the user symbol period which is max $N_u$ times longer for the lowest data rate. For numerical calculations, F≈K and $N_u$<<K, so that this computation rate is linear with respect to K.

In the long PN code, forward link embodiment, the diversity channel correlation matrix $C_d$ must be computed for every subsymbol epoch. The computation rate for determining G'G given the sequence correlation matrices, Eq. (36), is $$CMR_{G'G}(F) = \frac{1}{2}(P+2)(P+1) M^2 W_{FF}^2 / T \tag{40}$$

where the delay-user width is $$W_{FF} = \mu \upsilon + K(P+1) \approx K(2P+1)$$

for ν=P and K>>λ.

The correlation matrix $R = G'G + \sigma^2 I$ provided by the forward filter correlator 92 is inverted in the correlation matrix inversion 93 block in FIG. 9 to produce the inverse matrix $R^{-1}$. The forward filter solution is generated in the user vector generator 94 in accordance with Eq. (26a) as the column of the inverse matrix associated with the user to be detected.

Since R is positive definite and a rank of $W_{FF}$ the inverse computation of the correlation matrix R in Eq. (26b) uses a Cholskey decomposition [A. A. Giordano and F. M. Hsu, *Least Square Estimation with Application to Digital Signal Processing*, John Wiley and Sons, New York, N.Y., 1985, Chapter 3.3.] with complexity order of $CMR_{sol}(R) = (W_{FF})^3 / 6fT$ where f=F the number of subsymbols in the frame for the short PN code reverse-link embodiment and f=1 for the long PN code embodiments in the forward link In the reverse link since F=K this computation rate is of about the same complexity as the forward filter equalization in Eq.(34). Note that once $R^{-1}$ has been calculated, the forward filter vectors are simply the column vectors of $R^{-1}$ and no further calculation is required. For the forward link embodiment a power series expansion is presented subsequently in order to reduce the CMR dependence on K from cubic to square.

Sparce Matrix Technique

Figure 11:
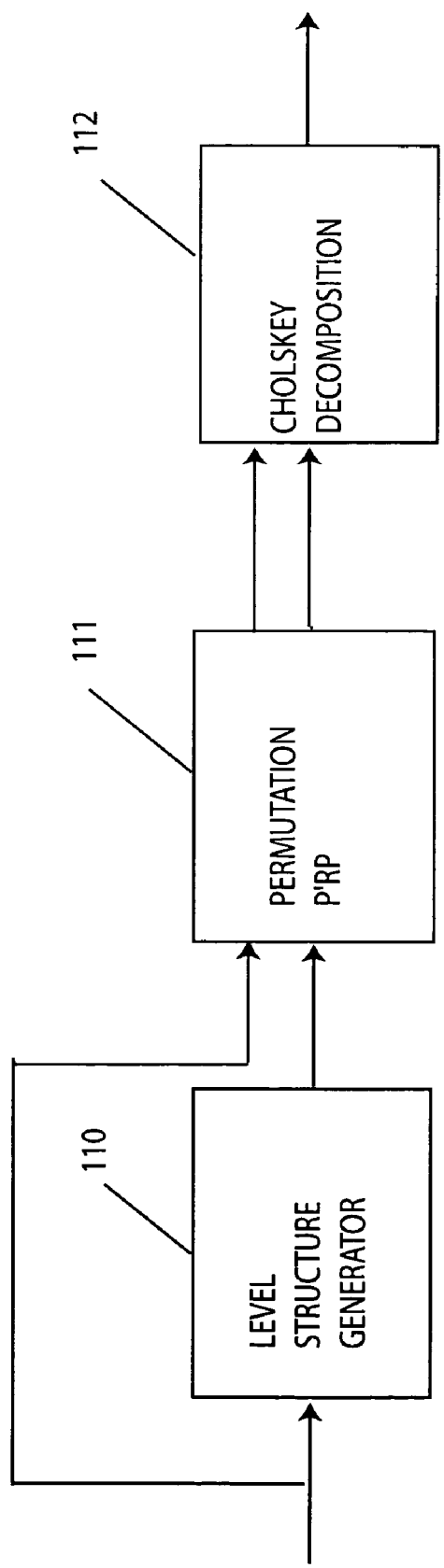
FIG. 11 is a block diagram of the correlation matrix inversion subsystem in the equalizer calculator of FIG. 9.

In an alternative embodiment for application in the reverse link, the inversion of the matrix R is accomplished using a sparse matrix technique, as described for example in S. Pissanetzky, Academic Press, NY, 1984, inversion techniques and shown in FIG. 11. These techniques both reduce computational complexity and improve numerical precision. In the alternative embodiment the Cuthill, McKee algorithm described in Cuthill and McKee, Brandon Systems Press, NJ, 1969, Sec. 4.4. is employed to generate in a level structure generator 110 from the correlation matrix produced in Forward Filter Correlator 92 an undirected graph and a level structure rooted at a minimum degree vertex that is further processed by an algorithm described in Gibbs, SIAM J. Numerical analysis 13, 1976, PP. 236-250, to generate longest level structures. For this longest level structure a permutation matrix P is obtained wherein each column of P contains a single "1" value and the remaining column values are zero. The permuted matrix R'=P'RP computed in permutation block 111 has nonzero elements located within a band more closely concentrated about the diagonal. If the bandwidth of the hermetian matrix R' is s where $|R_{ij}'|=0, j>i+s$, then a truncated Cholskey decomposition in Cholskey decomposition block 112 requires only $W_{FF} S^2/2$ complex multiplies. Tests show that the bandwidth S<<K so that with this sparse matrix technique the computation complexity of the inverse of R can be neglected compared to the CMR of the forward filter computations in Eq.(34). In an embodiment with direct calculation of the inverse the level structure generator 110 is skipped, the permutation matrix is the identity matrix, and Cholskey decomposition 112 is used alone to determine the inverse.

Power Series Expansion

In the long PN code forward link embodiment, the complexity is dominated by a cubic dependence on the number of users due to the matrix inversion required for every subsymbol. All other computations in this embodiment result in a quadratic, linear, or zero dependence on the number of users K. In order to reduce the computational burden to a quadratic dependence, a power series expansion is presented as a preferred embodiment in the forward link configuration with a long period PN code. Simulation results show that performance degradation is acceptable for the power series expansion approximation.

The power series expansion is described for a single cell application in the forward link. After combining the D diversity channel correlation matrices in Eq. (35) the sum matrix has the form $$C = \sum_{d=0}^{D-1} C_d, \quad C_d = G'_d G_d$$

This matrix is calculated in the forward filter calculator 92 of FIG. 9. The diagonal elements within the C matrix corresponding to users within the forward link cell containing the desired user to be detected will have a power contribution $$\rho = \sum_{d=0}^{D-1} \sum_{m=0}^{M-1} r_m |h_{dm}|^2$$

where $h_{dm}$, m=0,1, ..., M−1 represent the unique forward link diversity channel coefficients associated with detection of a single user. Each diversity channel coefficient $h_{d0}$ has no multipath delay and all other channel coefficients have an associated delay. The real coefficients $r_m$ result from PN code offsets due to multipath and are not dependent on the PN code signatures. Thus $r_0$=1 and 1>$r_m$>0,, m=1,2, ..., M−1.

The C matrix can then be written as $$C = \rho(I+D)$$

where the delta matrix D contains the off-diagonal elements of C/ρ and on the diagonal the difference between the C/ρ diagonal value and unity. Because of code correlation, multipath, and other cell interference attenuation, the elements in D are generally much smaller than unity. The delta matrix D is calculated in delta matrix calculator 95 shown in FIG. 9. Let $\underline{e}_k$ represent the $W_{FF} \times 1$ delta vector (see Eq. (22)) for the desired user. The vector $\underline{e}_k$ contains all zeros except for a value of unity at the kth row position corresponding to the desired user index value. The optimum forward filter vector is $$\underline{w} = C^{-1} \underline{e}_k$$

Expand $C^{-1}$ in a power series expansion $$\rho C^{-1} = (I+D)^{-1} \doteq I - D + \frac{1}{2}D^2 - \frac{1}{6}D^3$$

and let the kth column of the delta matrix D be denoted as $\underline{d}_k^{(1)}$. Each iteration $$\underline{d}_k^{(n+1)} = D \underline{d}_k^{(n)}, n=1,2$$

requires $(2P+1)^2 K^2$ complex multiplies. The forward filter approximation $$\tilde{\underline{w}} = \frac{1}{\rho} \left( \underline{e}_k - \underline{d}_k^{(1)} + \frac{1}{2} \underline{d}_k^{(2)} - \frac{1}{6} \underline{d}_k^{(3)} \right) \qquad (41)$$

is accurate to the third order and has a complex multiply rate of $$CMR_{sol}(F) = 2(2P+1)^2 K^2 / T \qquad (42)$$

The calculation of the iteration Eq. (41) for the forward filter vector in the long PN code embodiment is accomplished in the vector iteration calculator 96 of FIG. 9.

Backward Filter Cancellation

The calculation of equalization signals in the backward filter 100 of FIG. 10 by subtraction of past interference signals G'Fα in accordance with Eq. (27b) requires the subdecision values $\underline{a}_{-\lambda}(q)$ for q<0. The components of the cancellation vector β=Fα for each diversity d and subsymbol epoch l=0,1, ..., P−1 are given in Eq.(11) to be the NQ vector $$\underline{\beta}_d^{(n)}(l) = \sum_{q=-v-P}^{q \max} S_{d\lambda M}^{(n)}(l,q) H_{d\lambda} \underline{a}_\lambda^{(n)}(q) \quad -v \le l < P$$

where $q_{max}$=min(−1,l) and one notes that no cancellation is required for l=P because there is no past intersymbol interference, i.e. $\underline{\beta}_d^{(n)}(P) = \underline{0}$.

Rewriting the backward filter cancellation of Eq. (27b) in terms of the negative-delay subsymbol epochs of the forward filter and the corresponding matched filter subvectors, x(l), the equalization signals produced in backward filter 100 for processing in forward filter 101 are $$\underline{y}^{(n)}(P) = \underline{x}^{(n)}(P)$$

$$\underline{y}^{(n)}(l) = \underline{x}^{(n)}(l) - \underline{b}^{(n)}(l) \quad -v \le l < P \qquad (43)$$

The past interference signal is found from using the lower diagonal property of $G_d$ to be $$\underline{b}^{(n)}(l) = \sum_{d=0}^{D-1} \sum_{p=l}^{l+P} G_d^{(n)'}(p,l) \underline{\beta}_d^{(n)}(p) \quad -v \le l < P$$

The past equalization signals for l<0 have a vector rank of μ. The present (l=0) and future (l>0) equalization signals have a vector rank of K=λ+μ. Accordingly the submatrices in $G_d$ have different dimensions depending on the negative delay index l. Define $$J(p) = \begin{cases} K & p \ge 0 \\ \mu & p < 0 \end{cases}$$

and using the values of $G_d$ in Eq (14a), one has $$\underline{b}^{(n)}(l) = \sum_{q=-v-P}^{-1} \Gamma_{J(l)\lambda}^{(n)}(l,q) \underline{a}_\lambda(q) \qquad (44)$$

The backward filter matrix weights F in Eq. (44) are the backward filter parameters computed in backward filter calculator 91 of FIG. 9. Eq.(44) is performed in the backward filter 100 of FIG. 10. This equation describes the past interference signals resulting from multiplication of the backward filter parameters by the subdecisions produced in multiuser quantizer 102. The CMR for the short PN code reverse-link embodiment for backward filter multiplication with ν=0 and λ=K is $$CMR_{BF}(R) = P^2 K^2 / l_F T$$

For the long PN code in the forward link embodiment the CMR for backward filter multiplication with ν=P and λ<<K is $$CMR_{BF}(F)=2P^2\lambda(K+\lambda)/I_FT$$

Since $I_F=\delta K$ the reverse link CMR for backward filter multiplication is linear in K while the forward link CMR has zero K dependence. The backward filter parameters are the cross channel/sequence correlator matrices of dimension J(l)×λ.

$$\Gamma_{J(l)\lambda}^{(n)}(l,q) = \sum_{d=0}^{D-1}\sum_{p=l}^{q+P} H'_{dJ(p)}S_{dJ(p)M}^{(n)\nu}(p,l)\ S_{d\lambda M}^{(n)}(p,q)H_{d\lambda} \qquad (45)$$

$$-\nu - P \le q \le -1$$

$$\Gamma_{J(l)\lambda}^{(n)}(l,q) = 0 \text{ otherwise} \quad -\nu \le l \le q+P$$

The inner products of the sequence matrices in the above calculation require no complex multiplies and do not contribute to the CMR. These inner products are supplied by sequence signal generator 68 of FIG. 6 to the backward filter calculator 91 in the equalizer calculator 64 shown in FIG. 9. In calculator 91 because of the block diagonal structure of the channel matrices, each cross channel/sequence correlator matrix requires approximately $(P+1)DK^2M^2$ complex multiplies for the short PN code reverse-link embodiment with λ=K and approximately $(2P+1)DK\lambda M^2$ complex multiplies for the long PN code forward-link embodiment. There are (P+1)P/2 of these matrices in the reverse link embodiment and (2P+1)P of these matrices for the forward link embodiment. The CMR values are then $$CMR_r(R)=DM^2K^2(P+1)^2P/2FT$$

$$CMR_r(F)=DM^2K\lambda(2P+1)^2P/T$$

Since F=K both CMRs for backward filter correlator matrix calculation are linear in K. Because of the block processing required in the frame it is necessary to store the received inputs for the entire frame. Thus there is no delay problem in making the previous decisions available before forward filter equalization. The backward filter contributions to the CMR are no worse than linear with the number of users K. In large user systems this linear dependence means that the complexity of the backward equalizer is negligible. When the backward filter cancellation is performed either before the matched filter operation or after the forward equalizer equalization, the CMR is quadratic in K.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A method for receiving digital data information that is user-unique and is transmitted from a plurality of user transmitting terminals over multipath and multiple-access interference channels to a receiving terminal with one or more diversity antennas containing associated received diversity signals, wherein the user transmitting terminal adds error-correcting coding and interleaving, and its associated interleaving delay, to the digital data information to provide a sequence of digital data symbols at a user symbol rate that is the reciprocal of a user integer multiple of a system period and subsequently multiplies the digital data symbols by a user-unique direct-sequence spread spectrum (DSSS) signal to provide a modulated signal for transmission to the receiving terminal, and wherein the receiving terminal produces within a data frame successive user decisions corresponding to transmitted digital data symbols for a set of λ detected users, said receiving method comprising the steps at the receiving terminal of:

time-sampling and grouping received diversity signals into a receiver time block that has a time duration that is no more than one-half of the interleaving delay;

producing DSSS replicas of the user-unique DSSS signals for K=μ+λ mutually-interfering user signals where K>1 and μ is equal to the number of interfering users that are not detected;

estimating from a correlation of the received diversity signals and signal representative of the transmitted data signals a set of channel parameters associated with the receiver time block;

formatting the DSSS replicas to provide a set of sequence signals;

sequence combining the received diversity signals and sequence signals to provide sequence matched signals;

channel combining the sequence matched signals and channel parameters to provide channel matched signals, which depend on a subdecision interval that corresponds to a digital data subsymbol equal in duration to the system period and which further depend on subsymbol delay offsets that are relative to the subdecision interval;

processing the channel parameters and sequence signals to provide forward and backward filter parameters;

creating past interference signals that depend on the subdecision interval;

subtracting the past interference signals from the channel matched signals to provide equalization signals that depend on the subdecision interval and subsymbol delay offsets;

forward combining the equalization signals and the forward filter parameters to provide λ user subsymbol estimates for successive subdecision intervals within the data frame;

summing the user integer multiple successive subsymbol estimates to provide a user symbol estimate of the transmitted user digital data symbol;

selecting, at the user symbol rate for users in the set of λ detected users, the user decision as the possibly transmitted digital data symbol that is closest to the user symbol estimate;

partitioning the user decisions into subdecisions associated with subdecision intervals; symbol deinterleaving and error-correcting decoding the user symbol estimate to recover digital data information; and wherein the creating step further comprises:

multiplying the backward filter parameters and subdecisions from previous subdecision intervals to provide the past interference signals.

2. The method of claim 1 wherein the user transmitting terminals are geographically separate and grouped within cell regions associated with central stations and wherein the receiving terminal is located at a central station and wherein the number of detected users λ is greater than the number of users in the cell region associated with the receiving terminal central station.

3. The method of claim 2 wherein the number $\mu$ of interfering users not detected is zero and wherein the equalization signals in the subtracting step further include:
   K present equalization signals with no symbol delay; and
   K future equalization signals with a symbol delay of minus one.

4. The method of claim 1 wherein the user transmitting terminals are collocated at a plurality of central stations and wherein the receiving terminal is located within a cell region of an associated central station and wherein the number of mutually-interfering user signals K is greater than the number of collocated user transmitting terminals at the associated central station.

5. The method of claim 4 wherein the number $\mu$ of interfering users not detected is greater than zero and wherein the equalization signals in the subtracting step further include:
   $\mu$ past equalization signals with a symbol delay of one symbol;
   K present equalization signals with no symbol delay; and
   K future equalization signals with a symbol delay of minus one symbol.

6. The method of claim 1 wherein the DSSS signals associated with the user transmitting terminals employ a time period that is longer than the system period and wherein the processing step provides successive sets of forward and backward filter parameters for successive subdecision intervals.

7. The method of claim 6 wherein the processing step further includes the steps of:
   calculating a correlation matrix as the scaled sum of an identity matrix and a delta matrix;
   initializing the column of the delta matrix associated with the detected user as the first order term of a forward filter vector;
   iteratively computing the forward filter vector nth order term as the product of the delta matrix and the (n−1) th term;
   combining a unit vector and n, n>1, forward filter vector terms in a power series expansion to provide the forward filter vector.

8. The method of claim 1 wherein the user transmitting terminals are collocated at a plurality of central stations and wherein the receiving terminal is located within a cell region of an associated central station and wherein the number of detected users $\lambda$ is equal to unity and wherein the $\mu$ interfering users, $\mu>0$, that are not detected have transmitted signals from central stations associated with adjacent cell regions.

9. The method of claim 8 wherein the DSSS signals for the user transmitting terminals collocated at a central station are mutually orthogonal.

10. The method of claim 1 wherein the processing step further includes the steps of:
    calculating a correlation matrix;
    inverting the correlation matrix to provide an inverse matrix;
    selecting a column of the inverse matrix as a forward filter vector for one of the $\lambda$ detected users.

11. The method of claim 10 wherein the forward combining step further includes the step of:
    forming successive dot products of the forward filter vector and equalization signals to provide successive subsymbol estimates for one of the $\lambda$ detected users.

12. The method of claim 10 wherein the inverting step further includes the step of:
    decomposing the correlation matrix with a Cholesky decomposition.

13. The method of claim 12 wherein the decomposing step further includes the steps of:
    generating a level structure:
    computing a permutation matrix;
    premultiplying and post-multiplying the correlation matrix by the permutation matrix to provide a modified correlation matrix, that has nonzero elements concentrated in a bandwidth centered on the diagonal;
    truncating the Cholesky decomposition to the nonzero element bandwidth.

14. The method of claim 1 wherein the received diversity signals in the time-sampling and grouping step are time sampled at an integer multiple of the DSSS symbol rate where the integer is greater than unity.

15. The method of claim 1 wherein the estimating step further includes the steps of:
    modulating user decisions from the previous data frame that are representative of the transmitted digital data signals with the associated DSSS replica to provide a set of reference replicas;
    correlating received diversity signals from the previous receiver time block and the reference replicas to provide coarse channel parameters;
    reference processing the reference replicas to provide a correction matrix;
    multiplying the correction matrix and coarse channel parameters to provide the channel parameters for the present receiver time block.

16. The method of claim 1 wherein the user transmitting terminal further includes transmission of reference data that is representative of the transmitted digital data signals and known at the receiver; and wherein the estimating step further includes the steps of:
    producing a plurality of reference replicas that are each associated with the reference data of a user transmitting terminal;
    correlating received diversity signals and the reference replicas to provide coarse channel parameters;
    reference processing the reference replicas to provide a correction matrix;
    multiplying the correction matrix and coarse channel parameters to provide the channel parameters.

17. The method of claim 1 wherein a plurality of central stations include pilot transmitting terminals for transmission of reference data that is representative of the transmitted digital data signals and that is unique to the central station and known at the receiver; and wherein the estimating step further includes the steps of:
    producing a plurality of reference replicas that are each associated with the reference data of a pilot transmitting terminal;
    correlating received diversity signals and the reference replicas to provide coarse channel parameters;
    reference processing the reference replicas to provide a correction matrix;
    multiplying the correction matrix and coarse channel parameters to provide the channel parameters.

18. For use in a multiuser communication system wherein digital data information that is user-unique is transmitted from a plurality of user transmitting terminals, that may be geographically separate or collocated at a central station, over multipath and multiple-access interference channels, and wherein the user transmitting terminal adds error-correcting coding and interleaving, and its associated interleaving delay, to the digital data information to provide a sequence of digital data symbols at a user symbol rate that is the reciprocal of a user integer multiple of a system period and subsequently multiplies the digital data symbols by a user-unique direct-sequence spread spectrum (DSSS) signal to provide a modulated signal for transmission, a receiver apparatus, that is associated with one or more diversity antennas containing associated received diversity signals, for producing within a data frame successive user decisions corresponding to transmitted digital data symbols for a set of λ detected users, comprising:

converters for time-sampling and grouping received diversity signals into a receiver time block that has a time duration that is no more than one-half of the interleaving delay;

a DSSS replica generator for producing DSSS replicas of the user-unique DSSS signals for K=μ+λ mutually-interfering user signals where K>1 and μ is equal to the number of interfering users that are not detected;

a channel estimator for estimating channel parameters associated with the receiver time block;

a sequence signal generator for formatting the DSSS replicas into a set of sequence signals;

a sequence matched filter that combines the received diversity signals and sequence signals to provide a set of sequence matched signals;

a channel matched filter that combines the sequence matched signals and channel parameters to provide a set of channel matched signals, which depend on a subdecision interval that corresponds to a digital data subsymbol equal in duration to the system period and which further depend on subsymbol delay offsets that are relative to the subdecision interval;

a equalizer calculator that computes a set of forward and backward filter parameters from the channel parameters and sequence signals;

a backward filter that generates past interference signals and subtracts the past interference signals from the channel matched signals to provide equalization signals that depend on the subdecision interval and subsymbol delay offsets;

a forward filter that combines the equalization signals and the forward filter parameters to provide λ user subsymbol estimates for successive subdecision intervals within the data frame;

a multiuser quantizer that sums the user integer multiple successive subsymbol estimates to provide a symbol estimate of the transmitted user digital data symbol, and further selects, at the user symbol rate for users in the set of λ detected users, the user decision as the possibly transmitted digital data symbol that is closest to the user symbol estimate, and further partitions the user decisions into subdecisions associated with subdecision intervals;

a symbol deinterleaver and error-correcting decoder that processes the user symbol estimate to recover digital data information; and wherein the backward filter further comprises:

means that multiply the backward filter parameters and subdecisions from previous subdecision intervals to provide the past interference signals.

19. A receiver apparatus according to claim 18 wherein the number μ of interfering users not detected is zero and wherein the backward filter equalization signals further include:

K present equalization signals with no symbol delay; and

K future equalization signals with a symbol delay of minus one.

20. A receiver apparatus according to claim 18 wherein the number μ of interfering users not detected is greater than zero and wherein the backward filter equalization signals further include:

μ past equalization signals with a symbol delay of one symbol;

K present equalization signals with no symbol delay; and

K future equalization signals with a symbol delay of minus one symbol.

21. A receiver apparatus according to claim 18 wherein the DSSS signals associated with the plurality of user transmitting terminals have time periods that are longer than the system period and the forward and backward filter parameters computed in the equalizer calculator are produced for successive subdecision intervals.

22. A receiver apparatus according to claim 21 wherein the equalizer calculator further includes:

forward filter correlator means for calculating a correlation matrix;

means for calculating a delta matrix from the correlation matrix;

means for iteratively computing the forward filter vector from the delta matrix.

23. A receiver apparatus according to claim 18 wherein the equalizer calculator further includes:

forward filter correlator means for calculating a correlation matrix; and inverting means for producing the correlation matrix inverse.

24. A receiver apparatus according to claim 23 wherein the inverting means further includes:

means for generating a level structure;

means for computing a permutation matrix and premultiplying and post-multiplying the correlation matrix by the permutation matrix to provide a modified correlation matrix, that has nonzero elements concentrated in a bandwidth centered on the diagonal; and means for performing a Cholesky decomposition.

25. A receiver apparatus according to claim 23 wherein the equalizer calculator further includes:

forward filter vector generator means for selecting a column of the correlation matrix inverse as a forward filter vector for one of the λ detected users.

26. A receiver apparatus according to claim 25 wherein the forward filter further includes:

means for forming successive dot products of the forward filter vector and equalization signals to provide the successive subsymbol estimates.

27. A receiver apparatus according to claim 18 wherein the received diversity signals in the converters are time sampled at an integer multiple of the DSSS symbol rate where the integer is greater than unity.

28. A receiver apparatus according to claim 18 wherein the receiver apparatus further comprises:

reference replica generator that modulates user decisions from the previous data frame with the associated DSSS replica to provide a set of reference replicas, and wherein the channel estimator further includes;

means for correlating received diversity signals from the previous receiver time block and the reference replicas to provide coarse channel parameters;

means for processing the reference replicas to provide a correction matrix;

means for multiplying the correction matrix and coarse channel parameters to provide the channel parameters for the present receiver time block.

29. A receiver apparatus according to claim 18 wherein user transmitting terminals further include transmission of user-unique reference data that are known at the receiver;

and wherein the receiver apparatus further comprises: reference replica generator that provides a plurality of reference replicas associated with user transmitting terminals, and wherein the channel estimator further includes:

means for correlating received diversity signals and the reference replicas to provide coarse channel parameters;

means for reference processing the reference replicas to provide a correction matrix;

means for multiplying the correction matrix and coarse channel parameters to provide the channel parameters.

30. A receiver apparatus according to claim 18 wherein a plurality of central stations include pilot transmitting terminals for transmission of station-unique reference data that are known at the receiver; and wherein the receiver apparatus further comprises:

reference replica generator that provides a plurality of reference replicas associated with pilot transmitting terminals, and wherein the channel estimator further includes:

means for correlating received diversity signals and the reference replicas to provide coarse channel parameters;

means for reference processing the reference replicas to provide a correction matrix;

means for multiplying the correction matrix and coarse channel parameters to provide the channel parameters.

* * * * *